(12) United States Patent
Hodgson et al.

(10) Patent No.: US 11,885,171 B2
(45) Date of Patent: Jan. 30, 2024

(54) VEHICLE INTERIOR COMPONENT

(71) Applicant: Shanghai Yanfeng Jinqiao Automotive Trim Systems Co. Ltd., Novi, MI (US)

(72) Inventors: Thomas Scott Hodgson, Holland, MI (US); Rick Alan Anderson, Grand Haven, MI (US); Dennis Jack VanHouten, Wyoming, MI (US); Randy Len Arendsen, Zeeland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 988 days.

(21) Appl. No.: 16/682,490

(22) Filed: Nov. 13, 2019

(65) Prior Publication Data

US 2020/0173217 A1 Jun. 4, 2020

Related U.S. Application Data

(60) Provisional application No. 62/912,907, filed on Oct. 9, 2019, provisional application No. 62/900,844, filed
(Continued)

(51) Int. Cl.
*B60R 5/00* (2006.01)
*E05F 3/22* (2006.01)
(Continued)

(52) U.S. Cl.
CPC ............... *E05F 3/22* (2013.01); *B60R 5/00* (2013.01); *B60R 7/06* (2013.01); *E05B 83/28* (2013.01);
(Continued)

(58) Field of Classification Search
CPC .......... E05B 83/28; E05B 83/30; E05B 83/32; E05B 77/06; E05B 77/12; B60R 5/00;
(Continued)

(56) References Cited

U.S. PATENT DOCUMENTS 3,621,510 A 11/1971 Rollins, Jr.
4,052,093 A 10/1977 Fattori
(Continued)

FOREIGN PATENT DOCUMENTS

DE 102010050800 A1 * 5/2012 ............. B60N 3/002
DE 202012010950 U1 3/2014
(Continued)

*Primary Examiner* — Kristina R Fulton
*Assistant Examiner* — Noah Horowitz

(57) ABSTRACT

A vehicle interior component is disclosed. The component may comprise a base comprising a bin; a cover moveable from a closed to an open position through an unlatched position; and a mechanism moveable to an extended position to prevent the cover from opening when subjected to an inertial force. The mechanism may hold the cover in a blocked position partially uncovering the bin. The mechanism may be re-set by opening the cover. The mechanism may comprise a blocker to prevent the cover from moving from the unlatched position to the open position. The cover may comprise a cam surface configured to move the blocker to re-set the mechanism and allow the cover to open. The cover may comprise an interface/bottom surface accessible when the cover is blocked by the mechanism. The component may comprise a console; storage compartment; instrument panel; floor console; or center console.

20 Claims, 23 Drawing Sheets

Related U.S. Application Data on Sep. 16, 2019, provisional application No. 62/774,970, filed on Dec. 4, 2018.

(51) Int. Cl.
  *B60R 7/06* (2006.01)
  *E05F 1/16* (2006.01)
  *E05B 83/28* (2014.01)
  *E05B 77/06* (2014.01)
  *E05C 1/08* (2006.01)
  *E05C 3/12* (2006.01)

(52) U.S. Cl.
  CPC .............. *E05F 1/16* (2013.01); *E05B 77/06* (2013.01); *E05C 1/085* (2013.01); *E05C 3/12* (2013.01); *E05Y 2201/638* (2013.01); *E05Y 2900/538* (2013.01)

(58) Field of Classification Search
  CPC .. B60R 7/04; B60R 7/046; B60R 7/06; B60R 2011/0007; E05C 3/12; E05C 3/22; E05C 3/30; E05C 2003/128; E05C 17/02; E05C 17/04; E05C 17/46; E05C 17/50; E05C 1/085
  See application file for complete search history.

(56) References Cited

U.S. PATENT DOCUMENTS

| | | | |
|---|---|---|---|
| 5,476,307 A | 12/1995 | Whalen | |
| 5,658,043 A | 8/1997 | Davidson | |
| 6,802,550 B1 | 10/2004 | Griggs, Jr. et al. | |
| 6,808,214 B2 | 10/2004 | Sato et al. | |
| 6,843,528 B2 | 1/2005 | Glynn et al. | |
| 7,097,220 B2 | 8/2006 | Haba | |
| 7,481,468 B2 | 1/2009 | Merideth et al. | |
| 7,607,727 B2 | 10/2009 | Park | |
| 7,793,995 B2 | 9/2010 | King et al. | |
| 7,845,701 B2 | 12/2010 | Müller | |
| 8,123,261 B2 * | 2/2012 | Kikuchi | E05C 19/022 292/137 |
| 8,167,348 B2 | 5/2012 | Fesenmyer | |
| 8,191,953 B2 | 6/2012 | Simon et al. | |
| 8,215,684 B2 | 7/2012 | Whitens et al. | |
| 8,388,040 B2 * | 3/2013 | Bone | B60R 7/06 292/DIG. 22 |
| 8,398,130 B2 * | 3/2013 | Park | E05B 83/28 292/DIG. 22 |
| 8,449,001 B2 | 5/2013 | Whitens et al. | |
| 8,727,399 B2 | 5/2014 | Russell et al. | |
| 8,961,062 B2 | 2/2015 | Gillis et al. | |
| 9,415,710 B2 | 8/2016 | Simon et al. | |
| 9,469,225 B1 | 10/2016 | Salenbien et al. | |
| 9,523,222 B2 | 12/2016 | Zhang et al. | |
| 9,637,032 B2 | 5/2017 | Salenbien et al. | |
| 9,713,972 B2 | 7/2017 | Bozio et al. | |
| 9,714,530 B2 | 7/2017 | Amick et al. | |
| 9,771,027 B2 | 9/2017 | Neumann et al. | |
| 9,771,743 B2 | 9/2017 | Roychoudhury et al. | |
| 9,810,003 B2 * | 11/2017 | Roychoudhury | E05B 77/04 |
| 10,024,087 B2 * | 7/2018 | Nakashima | E05B 77/06 |
| 10,112,510 B2 | 10/2018 | Purves et al. | |
| 10,189,390 B2 | 1/2019 | Gillis et al. | |
| 10,352,071 B2 | 7/2019 | Muntean et al. | |
| 10,391,904 B2 | 8/2019 | Aktas et al. | |
| 10,486,568 B2 | 11/2019 | Davis | |
| 10,696,204 B2 * | 6/2020 | Stewart | B60N 2/78 |
| 10,941,590 B2 * | 3/2021 | Giddings | E05C 19/022 |
| 11,499,347 B2 * | 11/2022 | Shin | B60R 7/04 |
| 2002/0171251 A1 | 11/2002 | Bieck et al. | |
| 2004/0201238 A1 | 10/2004 | Griggs, Jr. et al. | |
| 2015/0197966 A1 | 7/2015 | Regnault et al. | |
| 2015/0315824 A1 | 11/2015 | Gotzen et al. | |
| 2015/0354250 A1 | 12/2015 | Bendel et al. | |
| 2017/0159328 A1 | 6/2017 | Roychoudhury et al. | |
| 2019/0136592 A1 | 5/2019 | Muntean et al. | |

FOREIGN PATENT DOCUMENTS

| | | | | |
|---|---|---|---|---|
| DE | 102014103792 A1 * | 9/2015 | | B60R 7/04 |
| DE | 102014009465 A1 | 12/2015 | | |
| EP | 2133495 B1 | 11/2012 | | |
| EP | 2897837 A1 | 7/2015 | | |
| EP | 3187367 A1 | 7/2017 | | |
| EP | 3027830 B1 | 2/2018 | | |
| EP | 3361909 A1 | 8/2018 | | |
| EP | 3299216 B1 | 2/2020 | | |
| KR | 101209605 B1 | 12/2012 | | |
| WO | 2019010086 A1 | 1/2019 | | |

* cited by examiner

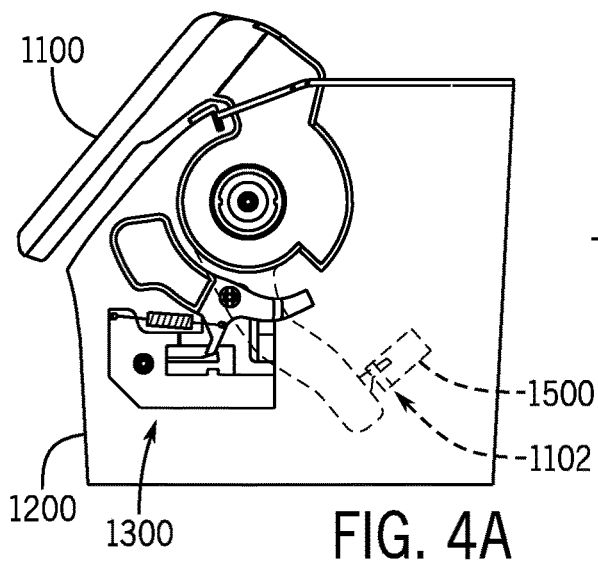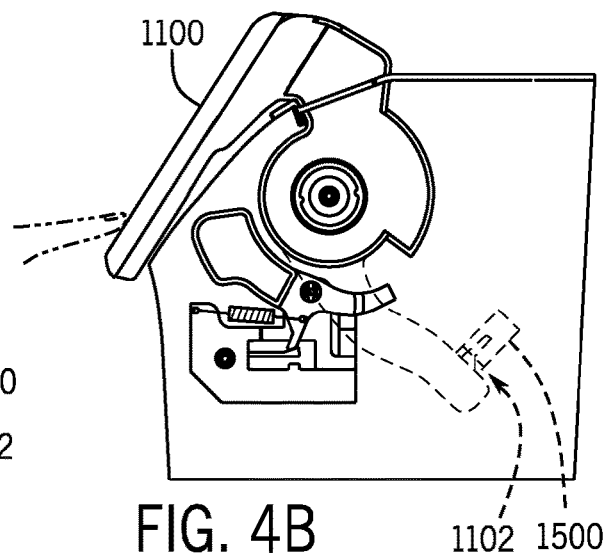
FIG. 4A  FIG. 4B
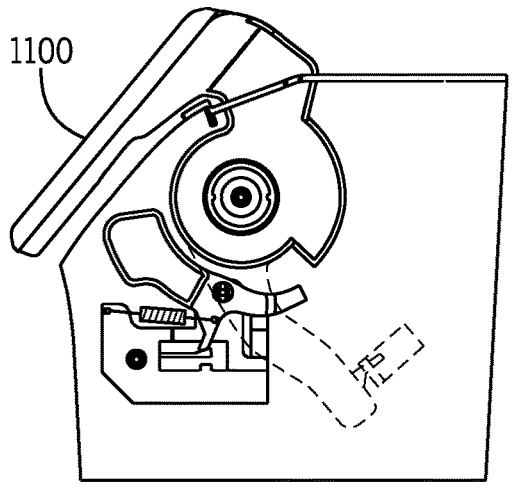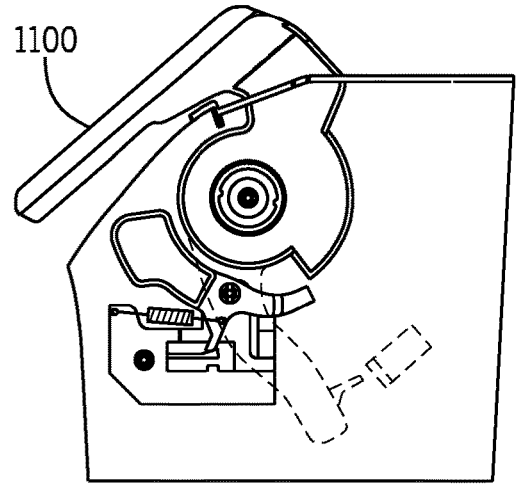
FIG. 4C  FIG. 4D
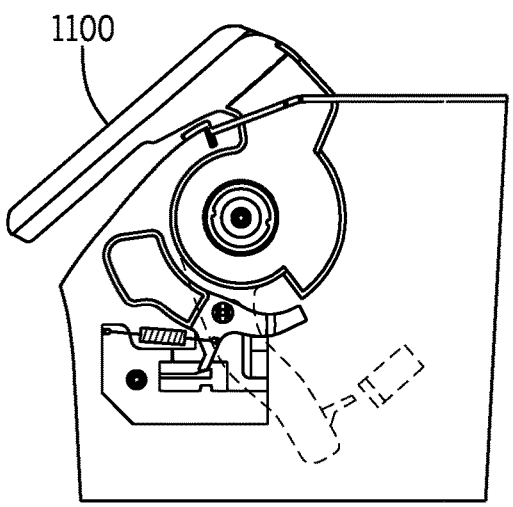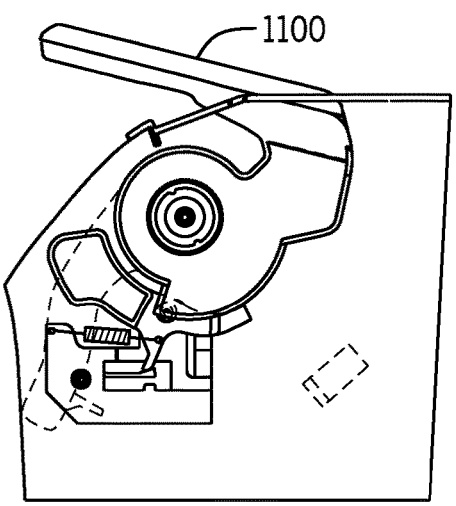
FIG. 4E  FIG. 4F

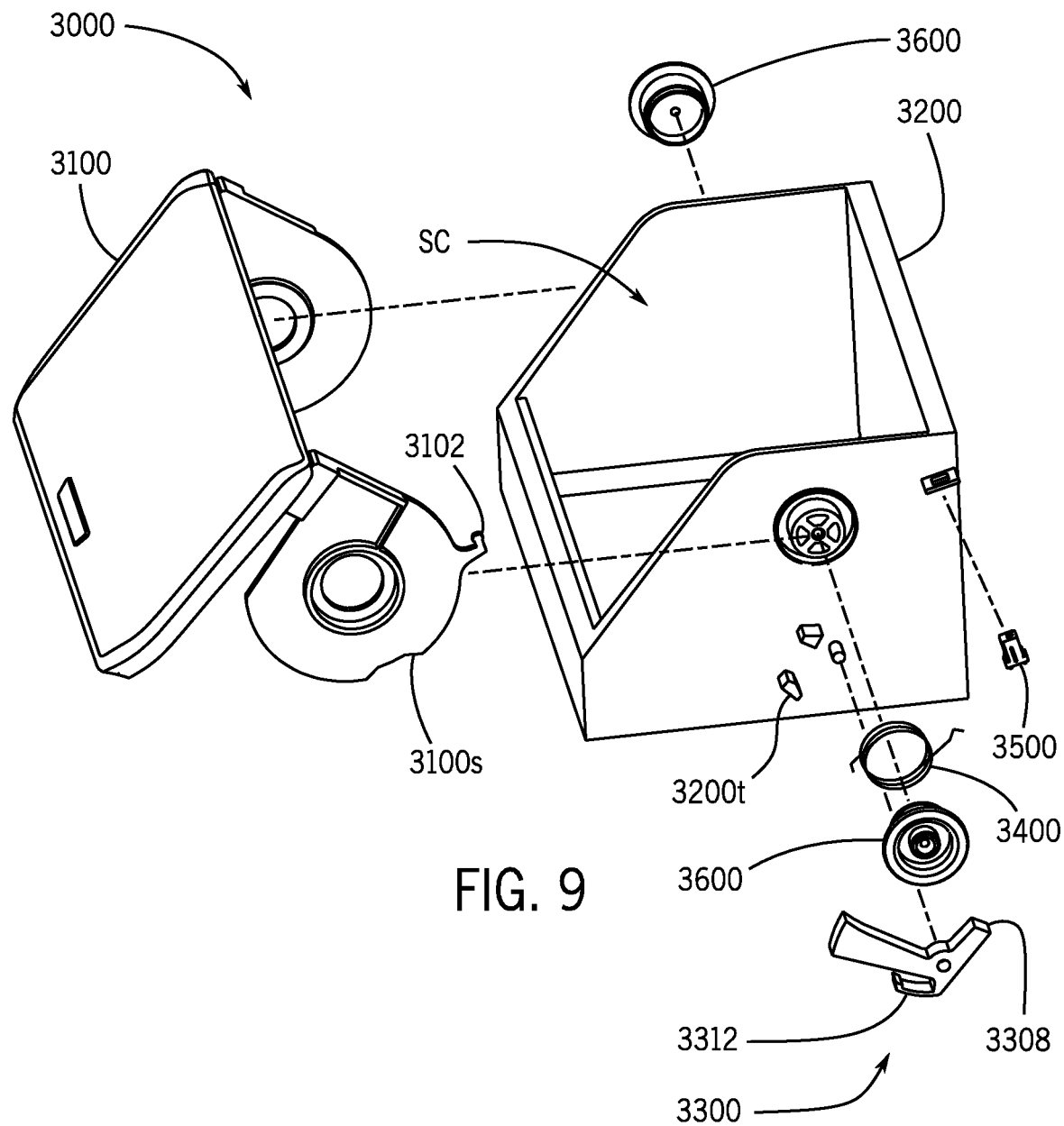

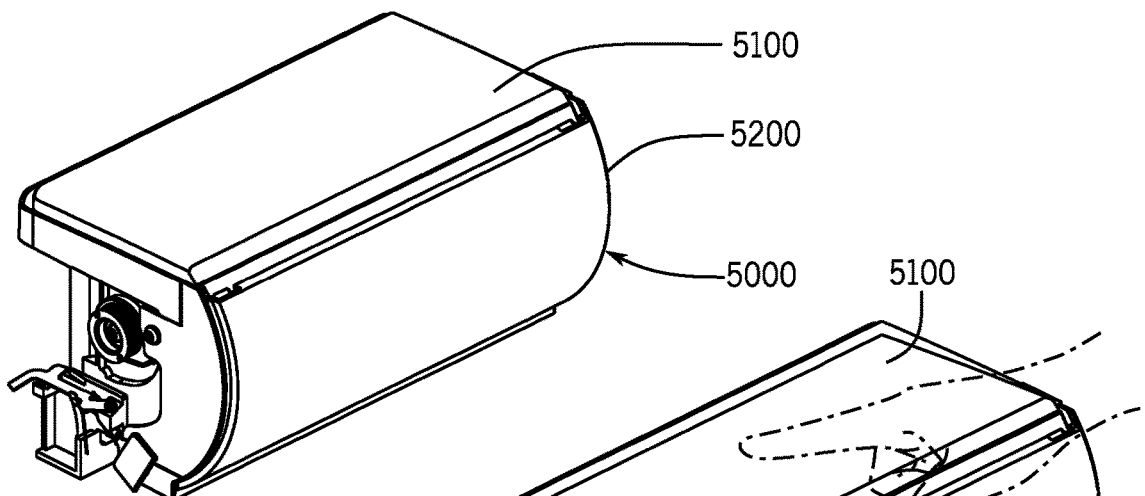
FIG. 15A
FIG. 15B
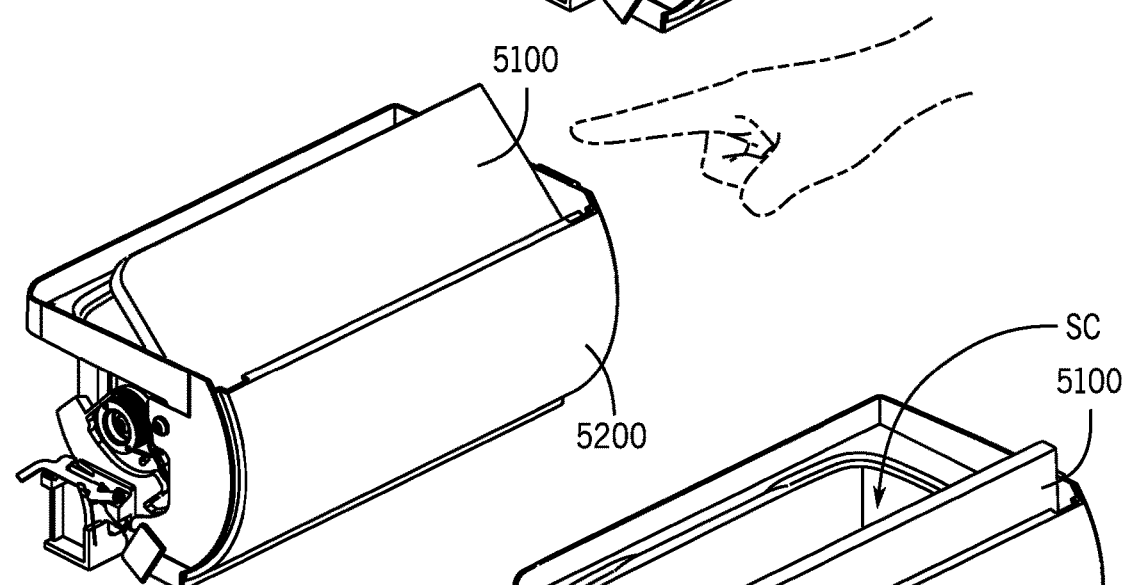
FIG. 15C
FIG. 15D

VEHICLE INTERIOR COMPONENT

CROSS-REFERENCE TO RELATED APPLICATIONS

The present application claims priority to and incorporates by reference in full the following patent application(s): (a) U.S. Provisional Patent Application No. 62/774,970 titled "VEHICLE INTERIOR COMPONENT" filed Dec. 4, 2018; (b) U.S. Provisional Patent Application No. 62/900,844 titled "VEHICLE INTERIOR COMPONENT" filed Sep. 16, 2019; (c) U.S. Provisional Patent Application No. 62/912,907 titled "VEHICLE INTERIOR COMPONENT" filed Oct. 9, 2019.

FIELD

The present invention relates to a vehicle interior component.

BACKGROUND

It is known to provide in a vehicle interior a component comprising a base with a compartment and a cover movable relative to the base to facilitate access to the compartment.

It would be advantageous to provide an improved vehicle interior component configured for improved functionality and operation comprising features (and combinations of features) as shown and described in the present application including a blocking mechanism for the cover.

SUMMARY

The present invention relates to a component for a vehicle interior configured for use in a vehicle subjected in operation to at least one external force such as an applied force comprising: a base comprising a bin; a cover configured to move from (a) a latched position to cover the bin to (b) an open position to uncover the bin through (c) an unlatched position; and a mechanism configured to hold the cover in a blocked position to prevent the cover from moving from the unlatched position toward the open position. The cover may comprise an interface configured for access when the cover is in the blocked position; the base may be configured to prevent access to the interface when the cover is in the latched position. The mechanism may be configured to move from a retracted position to an extended position to hold the cover in the blocked position. The interface may comprise a surface of the cover facing away from the interior of the vehicle; the cover may be configured to move the mechanism from the extended position to the retracted position in response to an applied force at the interface. The mechanism may comprise a blocker configured to move from a default position to a blocking position to prevent the cover from moving from the unlatched position to the open position. The blocker may be configured to slide against the cover to move from the blocking position to the default position. The cover may comprise a cam surface configured to move the blocker. The component may comprise at least one of (a) a console; (b) a storage compartment; (c) an instrument panel; (d) a floor console; (e) a center console.

The present invention relates to a component for a vehicle interior configured for use in a vehicle subjected in operation to at least one external force such as an applied force comprising: a base comprising a bin; a cover configured to move from (a) a latched position to cover the bin to (b) an open position to uncover the bin through (c) an unlatched position; and a mechanism configured to move from a retracted position to an extended position to hold the cover in a blocked position. The cover may be configured to move the mechanism from the extended position toward the retracted position. The cover may be configured to move the mechanism when the cover is moved by an external force from the blocked position toward the open position. The mechanism may comprise a blocker configured to contact a cam surface of the cover to hold the cover in the blocked position. The mechanism may comprise an arm configured to move from a biased position to a rotated position to prevent the cover from moving from the unlatched position to the open position. The base may comprise a tab configured to move to allow the blocker to move into engagement with the cover to hold the cover in the blocked position. The mechanism may comprise a spring configured to bias the blocker. The mechanism may comprise an arm configured to move from a biased position to a rotated position to prevent the cover from moving toward the open position.

The present invention relates to a component for a vehicle interior configured for use in a vehicle subjected in operation to at least one external force such as an applied force comprising: a base comprising a bin; a cover configured to move from (a) a latched position to cover the bin to (b) an open position to uncover the bin through (c) an unlatched position; and a mechanism configured to hold the cover in a blocked position to prevent the cover from moving from the unlatched position toward the open position. The mechanism may be configured to move from a retracted position to an extended position to hold the cover in the blocked position. The base may comprise a tab configured to (a) hold the mechanism in the retracted position; (b) hold the mechanism in the extended position. The tab may be configured to deflect to allow the mechanism to move between the retracted position and the extended position. The cover may be configured to move the tab as the cover moves from the blocked position toward the open position. The cover may be configured to deflect the tab to move the mechanism from the extended position toward the retracted position. The cover may be configured to move directly from the blocked position toward the open position. The component may comprise a bracket coupled to the base; the bracket may comprise the tab.

The present invention relates to a component for a vehicle interior configured for use in a vehicle subjected in operation to at least one external force such as an applied force comprising a base comprising a bin; a cover configured to move from (a) a latched position to cover the bin to (b) an open position to uncover the bin through (c) an unlatched position; and a mechanism configured to move from a retracted position to an extended position to prevent the cover from moving from the unlatched position toward the open position. The mechanism may be configured to move from the retracted position to the extended position in response to the applied force exceeding a predetermined amount. The base may be configured to cover the mechanism when the cover is in the latched position; the unlatched position; and the open position. The mechanism may be configured to hold the cover in a blocked position. The cover may be configured to (a) move in a closing direction from the latched position to the unlatched position; (b) move in an opening direction from the unlatched position through the latched position toward the blocked position. The cover may comprise a bottom surface facing away from the interior of the vehicle when the cover is in the latched position; the bottom surface of the cover may be configured for access when the cover is in the blocked position. The cover may comprise an interface; the interface may be configured for access when the cover is in the blocked position; the base may be configured to prevent access to the interface when the cover is in the latched position. The cover may be configured to partially uncover the bin when the cover is in the blocked position. The cover may be configured to move the mechanism from the extended position toward the retracted position. The cover may be configured to move the mechanism when the cover is moved by an external force from the blocked position toward the open position. The mechanism may comprise a blocker configured to move from a default position to a blocking position to prevent the cover from moving from the unlatched position to the open position. The blocker may be configured to move from the blocking position to the default position in response to an applied force on the blocker. The blocker may be configured to slide against the cover to move from the blocking position to the default position. The cover may comprise a cam surface configured to move the blocker. The cover may be configured to move the blocker from the blocking position toward the default position. The cover may be configured to move the blocker when the cover is moved by an external force from the blocked position toward the open position. The mechanism may comprise an arm configured to move from a biased position to a rotated position to prevent the cover from moving from the unlatched position to the open position. The arm may be configured to move to the rotated position to move the blocker from the default position to the blocking position. The arm and the blocker may comprise a unitary component. The base may comprise a tab configured to move as the arm moves between the biased position and the rotated position. The base may comprise a tab configured to deflect to allow the arm to move between the biased position and the rotated position. The base may comprise a tab configured to hold the arm in the rotated position. The component may comprise a bracket coupled to the base; the bracket may comprise the tab. The bracket may comprise a stop for the blocker. The cover may be configured to deflect the tab to move the arm from the rotated position toward the biased position. The base may comprise a tab configured to hold the arm in the biased position. The cover may be configured to move the arm from the rotated position to the biased position. The cover may be configured to move the arm when the cover is moved by an external force from the blocked position toward the open position. The mechanism may comprise a spring configured to bias the blocker in the default position. The spring may comprise a coil spring. The mechanism may be configured to hold the cover in a blocked position in response to the force exceeding the predetermined amount. The mechanism may comprise an inertia latch. The applied force may comprise an inertial force. The cover may comprise at least one of (a) a door; (b) a rotatable door. The component may comprise at least one of (a) a console; (b) a storage compartment; (c) an instrument panel; (d) a floor console; (e) a center console.

The present invention relates to a component for a vehicle interior configured for use in a vehicle subjected in operation to at least one external force such as an applied force comprising: a base comprising a bin; a cover configured to move from (a) a latched position to cover the bin to (b) an open position to uncover the bin through (c) an unlatched position; and a mechanism configured to move from a retracted position to an extended position to prevent the cover from moving from the unlatched position toward the open position. The mechanism may be configured to move from the retracted position to the extended position in response to the applied force exceeding a predetermined amount. The base may be configured to cover the mechanism when the cover is in the latched position; the unlatched position; and the open position. The mechanism may be configured to hold the cover in a blocked position. The cover may be configured to (a) move in a closing direction from the latched position to the unlatched position; (b) move in an opening direction from the unlatched position through the latched position toward the blocked position. The cover may comprise a bottom surface facing away from the interior of the vehicle when the cover is in the latched position; the bottom surface of the cover may be configured for access when the cover is in the blocked position. The cover may comprise an interface; the interface may be configured for access when the cover is in the blocked position; the base may be configured to prevent access to the interface when the cover is in the latched position. The cover may be configured to partially uncover the bin when the cover is in the blocked position. The cover may be configured to move the mechanism from the extended position toward the retracted position. The cover may be configured to move the mechanism when the cover is moved by an external force from the blocked position toward the open position. The mechanism may comprise a blocker configured to move from a default position to a blocking position to prevent the cover from moving from the unlatched position to the open position. The blocker may be configured to move from the blocking position to the default position in response to an applied force on the blocker. The blocker may be configured to slide against the cover to move from the blocking position to the default position. The cover may comprise a cam surface configured to move the blocker. The cover may be configured to move the blocker from the blocking position toward the default position. The cover may be configured to move the blocker when the cover is moved by an external force from the blocked position toward the open position. The mechanism may comprise an arm configured to move from a biased position to a rotated position to prevent the cover from moving from the unlatched position to the open position. The arm may be configured to move relative to the blocker in response to the applied force exceeding the predetermined amount to allow the blocker to move from the default position to the blocking position. The arm and the blocker comprise a unitary component. The arm may be configured to deflect as the arm moves between the biased position and the rotated position. The base may comprise a tab configured to move the arm between the biased position and the rotated position. The base may comprise a tab configured to hold the arm in the biased position and the rotated position. The cover may be configured to move the arm from the rotated position to the biased position. The cover may be configured to move the arm when the cover is moved by an external force from the blocked position toward the open position. The mechanism may be configured to hold the cover in a blocked position in response to the force exceeding the predetermined amount. The applied force may comprise an inertial force. The cover may comprise at least one of (a) a door; (b) a rotatable door. The component may comprise at least one of (a) a console; (b) a storage compartment; (c) an instrument panel; (d) a floor console; (e) a center console.

The present invention relates to a component for a vehicle interior configured for use in a vehicle subjected in operation to at least one external force such as an applied force. The component may comprise a base comprising a bin; a cover configured to move from (a) a latched position to cover the bin to (b) an open position to uncover the bin through (c) an unlatched position; and a mechanism configured to move from a retracted position to an extended position to prevent the cover from moving from the unlatched position toward the open position. The mechanism may be configured to move from the retracted position to the extended position in response to the applied force exceeding a predetermined amount. The base may be configured to cover the mechanism when the cover is in the latched position, the unlatched position and the open position. The mechanism may be configured to hold the cover in a blocked position. The cover may be configured to (a) move in a closing direction from the latched position to the unlatched position; (b) move in an opening direction from the unlatched position through the latched position toward the blocked position. The cover may comprise a bottom surface facing away from the interior of the vehicle when the cover is in the latched position; the bottom surface of the cover may be configured for access when the cover is in the blocked position. The cover may comprise an interface. The interface may be configured for access when the cover is in the blocked position. The base may be configured to prevent access to the interface when the cover is in the latched position. The cover may be configured to partially uncover the bin when the cover is in the blocked position. The mechanism may comprise a blocker configured to move from a default position to a blocking position to prevent the cover from moving from the unlatched position to the open position. The blocker may be configured to move from the blocking position to the default position in response to an applied force on the blocker. The mechanism may comprise an arm configured to move from a biased position to a rotated position to prevent the cover from moving from the unlatched position to the open position. The mechanism may comprise a spring configured to bias the arm in the biased position. The arm may be configured to move relative to the blocker in response to the applied force exceeding the predetermined amount to allow the blocker to move from the default position to the blocking position. The mechanism may comprise a spring configured to bias the blocker in the blocking position; the spring may be configured to move the blocker from the default position to the blocking position to prevent the cover from moving from the unlatched position to the open position. The spring configured to bias the blocker in the blocking position may comprise a cantilever spring. The mechanism may be configured to hold the cover in a blocked position in response to the force exceeding the predetermined amount. The cover may be configured to move from the blocked position to the open position in response to movement of the blocker from the blocking position to the default position. The applied force may comprise an inertial force.

The present invention also relates to a component for a vehicle interior configured for use in a vehicle subjected in operation to at least one external force such as an applied force. The component may comprise a base comprising a compartment configured to be accessed through an opening; a door configured for movement from (a) a closed position to cover the opening of the compartment to (b) an open position to uncover the opening of the compartment; and a mechanism configured to be actuated by the applied force and configured to retain the door in a blocked position when the applied force is greater than a predetermined value. The blocked position may comprise a position between the closed position and the open position. The mechanism may comprise (a) an arm configured to be actuated by the applied force; (b) a blocker configured to retain the door in the blocked position; and (c) a spring configured to engage the blocker. The arm may comprise a mass and may be configured to actuate the blocker to a blocking position when the applied force is greater than the predetermined value. The arm may be configured to be retained by a spring in a position to prevent the blocker from retaining the door in the blocked position. The arm may be configured to move to a position so that the blocker can be deployed to a blocking position when the applied force is greater than the predetermined value. The blocker may be configured to move under actuation from the spring to block movement of the door when the applied force is greater than the predetermined value.

FIGURES

FIGS. 4A through 4F are schematic section views of a vehicle interior component shown as a console assembly according to an exemplary embodiment.

FIG. 9 is a schematic exploded perspective view of a vehicle interior component shown as a console assembly according to an exemplary embodiment.

FIGS. 15A through 15D are schematic perspective views of a vehicle interior component shown as a console assembly according to an exemplary embodiment.

DESCRIPTION

Figure 1A:
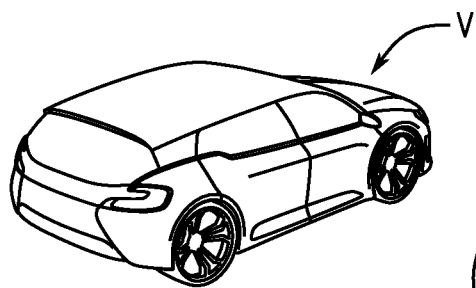
FIG. 1A is a schematic perspective view of a vehicle according to an exemplary embodiment.
Figure 1B:
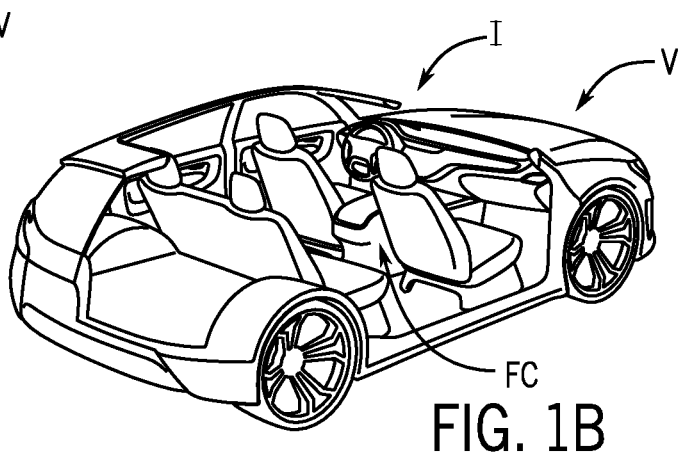
FIG. 1B is a schematic perspective view of a vehicle showing a vehicle interior according to an exemplary embodiment.
Figure 1C:
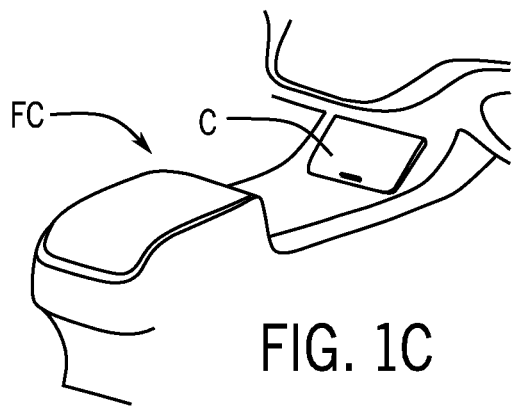
FIGS. 1C through 1E are schematic perspective views of a vehicle interior component shown as a console assembly according to an exemplary embodiment.
Figure 1F:
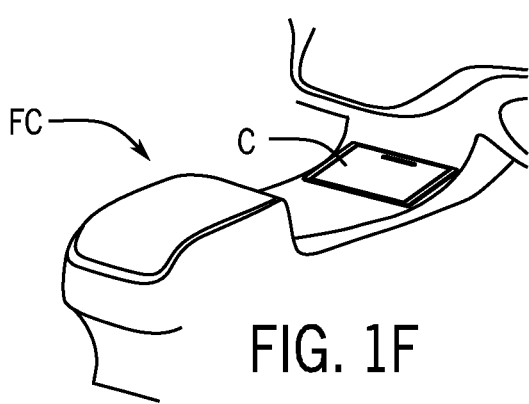
FIGS. 1F through 1H are schematic perspective views of a vehicle interior component shown as a console assembly according to an exemplary embodiment.
Figure 1D:
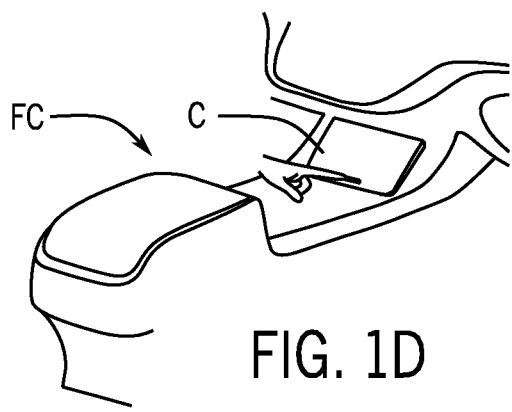
Figure 1G:
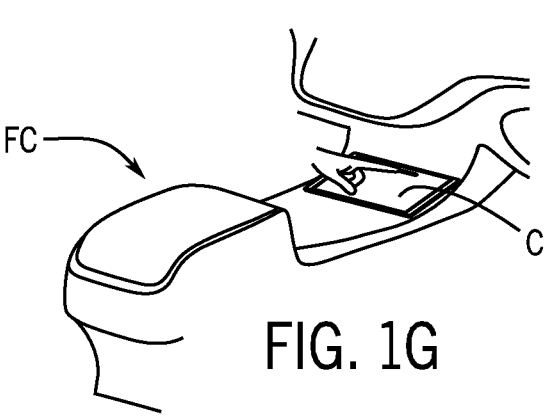
Figure 1E:
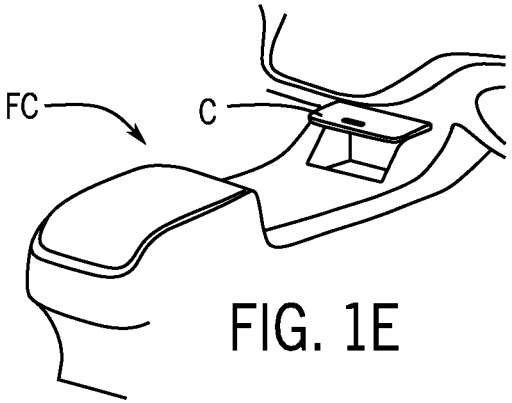
Figure 1H:
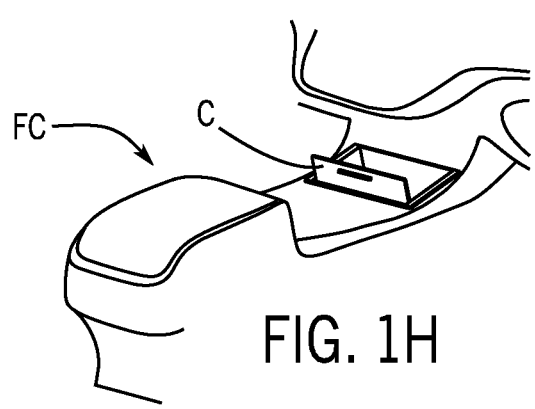
Figure 2A:
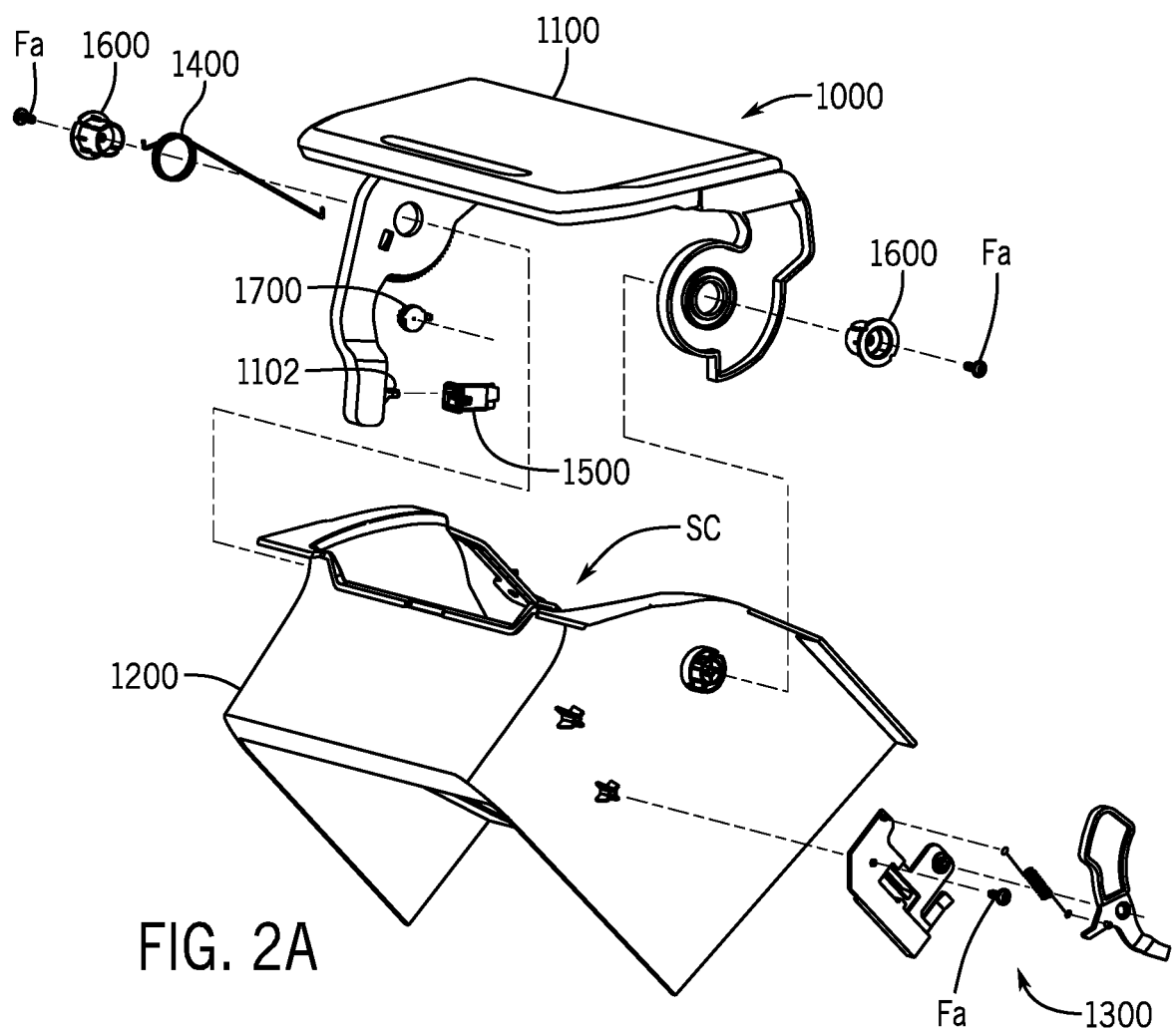
FIG. 2A is a schematic exploded perspective view of a vehicle interior component shown as a console assembly according to an exemplary embodiment.
Figure 2B:
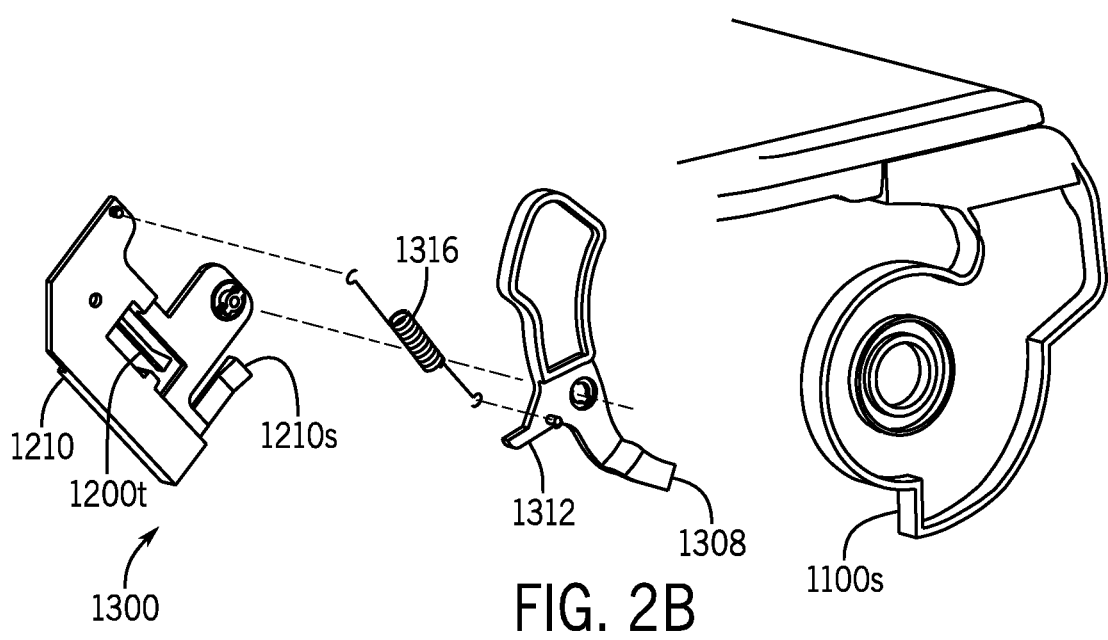
FIG. 2B is a schematic exploded perspective view of a mechanism for a vehicle interior component according to an exemplary embodiment.
Figure 3A:
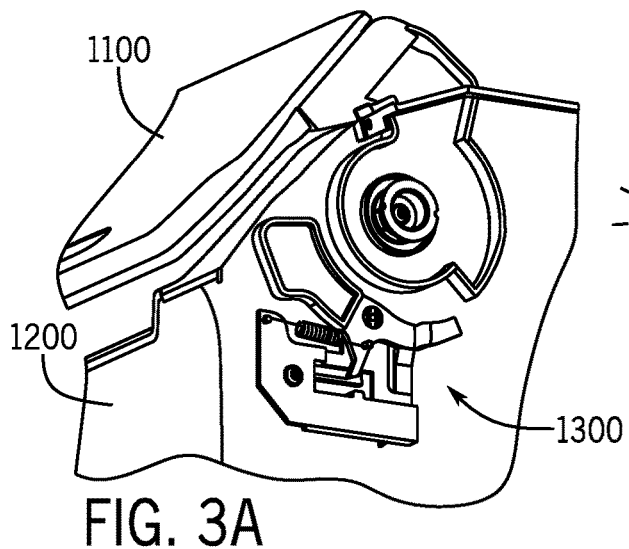
FIGS. 3A through 3F are partial schematic perspective views of a vehicle interior component shown as a console assembly according to an exemplary embodiment.
Figure 3B:
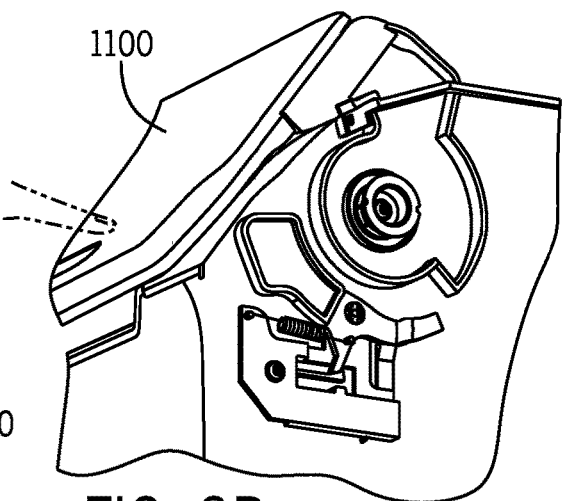
Figure 3C:
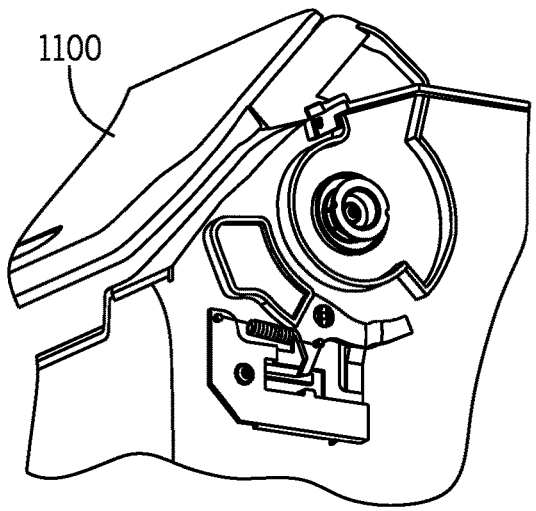
Figure 3D:
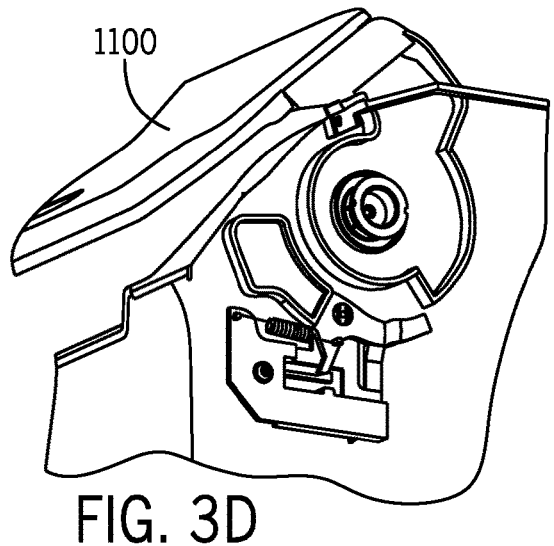
Figure 3E:
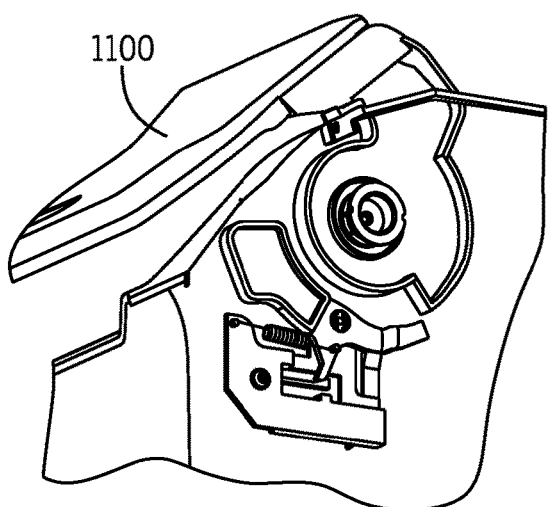
Figure 3F:
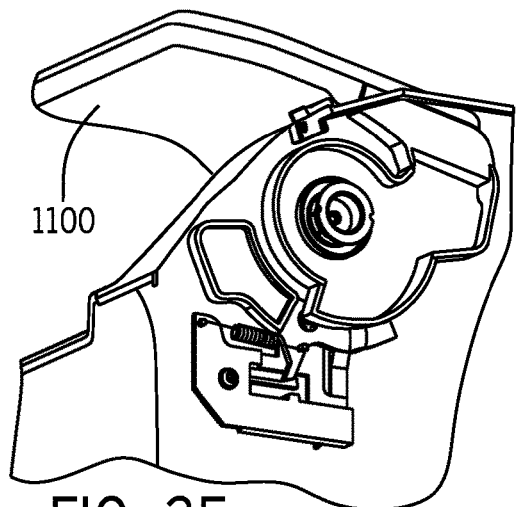
Figure 5A:
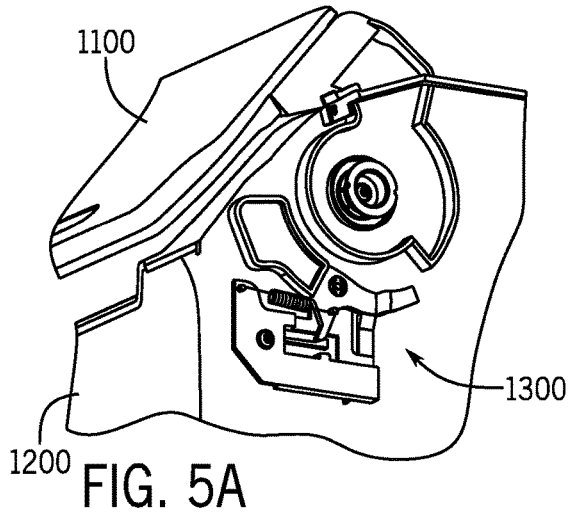
FIGS. 5A through 5F are partial schematic perspective views of a vehicle interior component shown as a console assembly according to an exemplary embodiment.
Figure 5B:
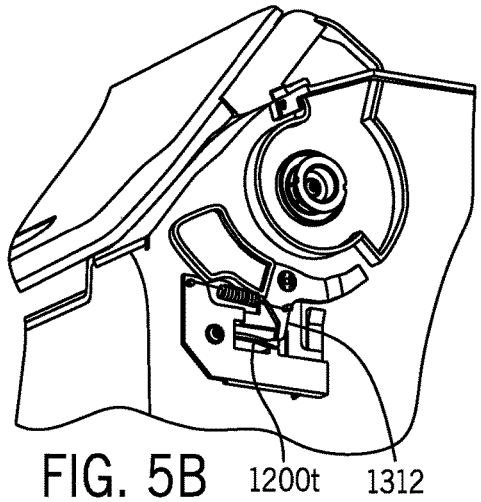
Figure 5C:
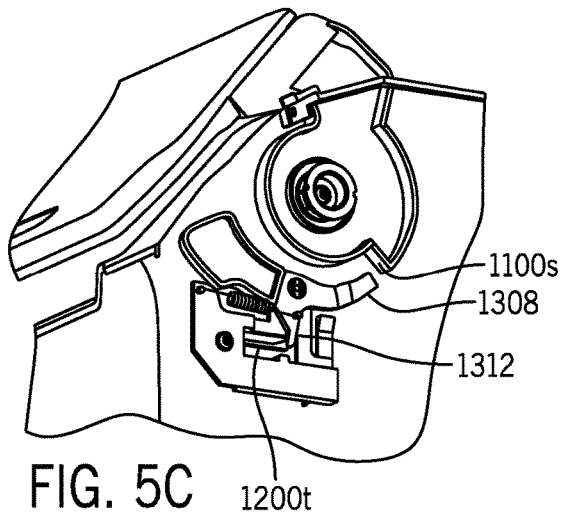
Figure 5D:
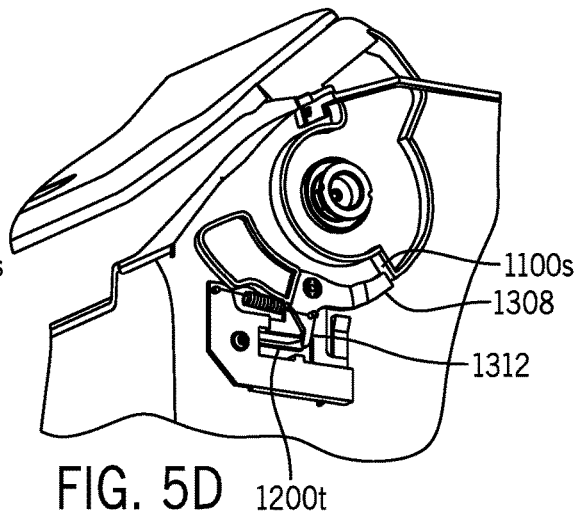
Figure 5E:
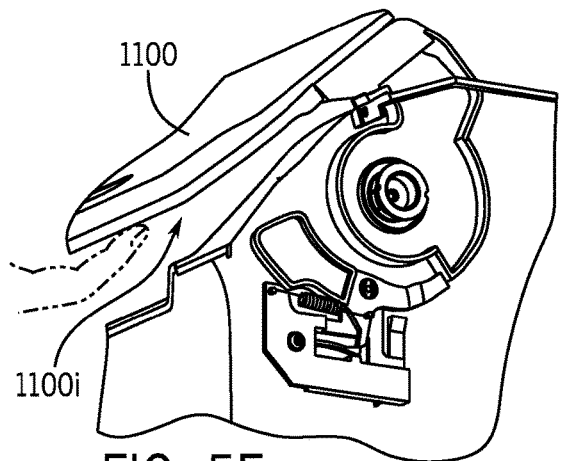
Figure 5F:
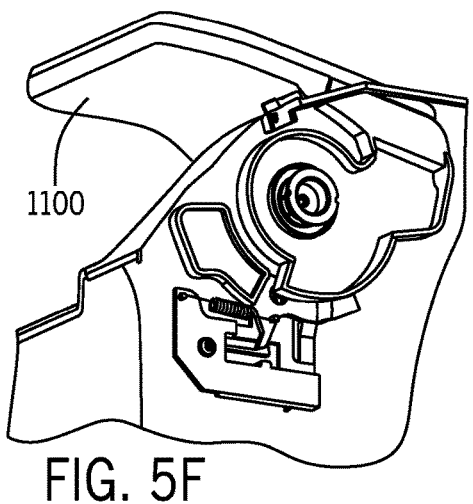
Figure 6A:
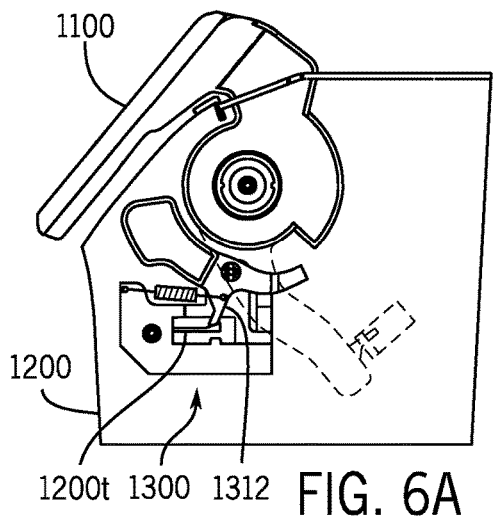
FIGS. 6A through 6F are schematic section views of a vehicle interior component shown as a console assembly according to an exemplary embodiment.
Figure 6B:
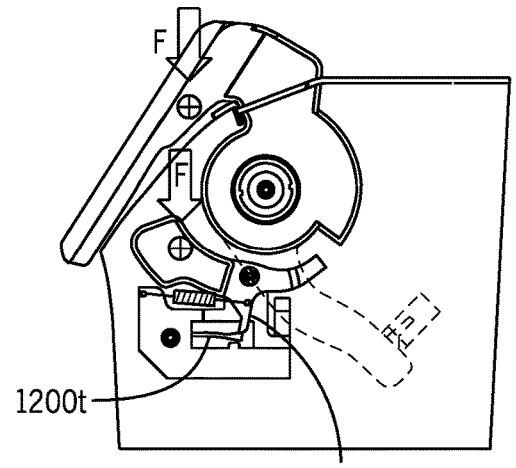
Figure 6C:
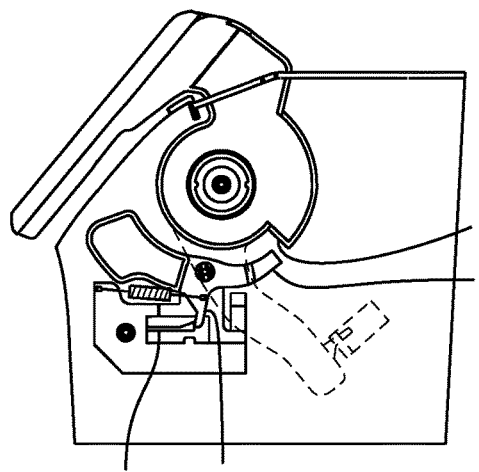
Figure 6D:
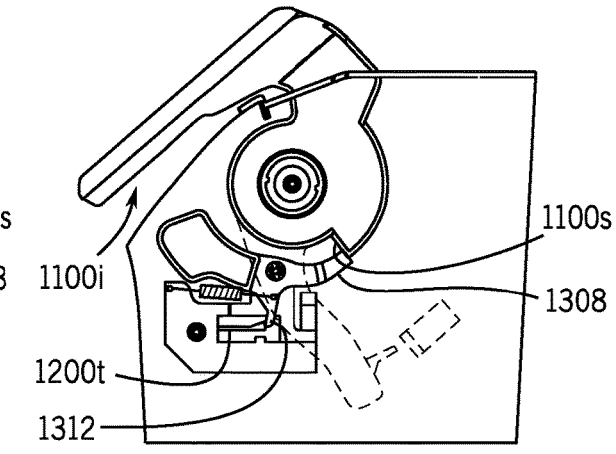
Figure 6E:
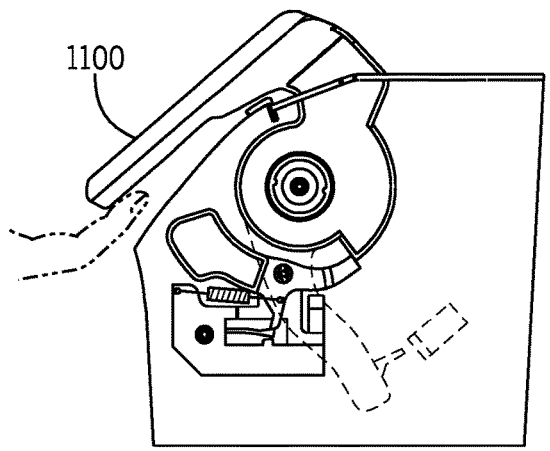
Figure 6F:
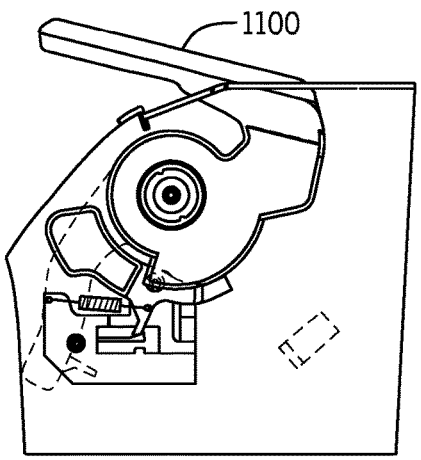
Figure 6G:
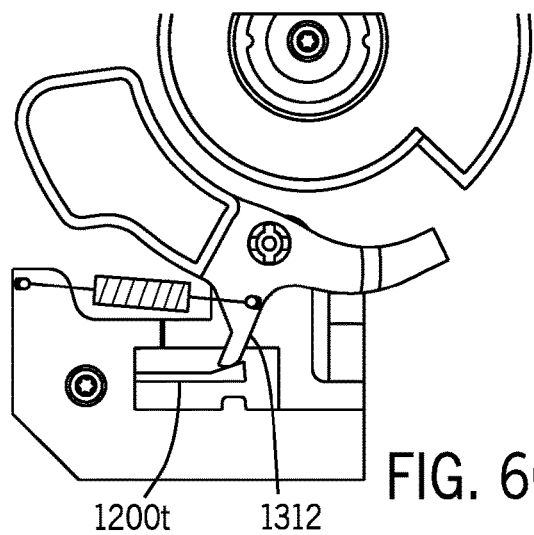
FIGS. 6G through 6L are schematic partial section views of a vehicle interior component shown as a console assembly according to an exemplary embodiment.
Figure 6H:
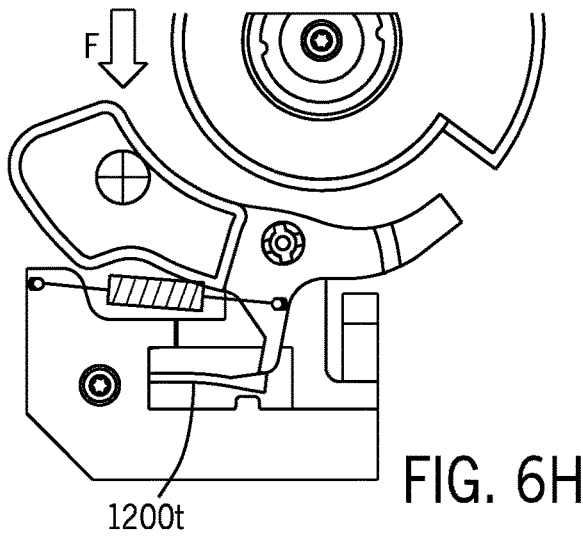
Figure 6I:
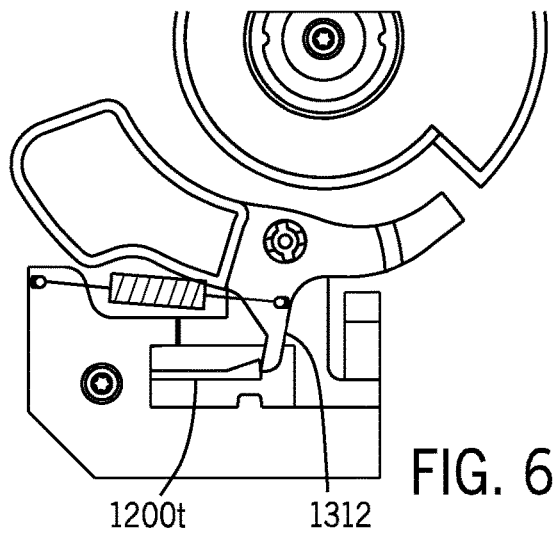
Figure 6J:
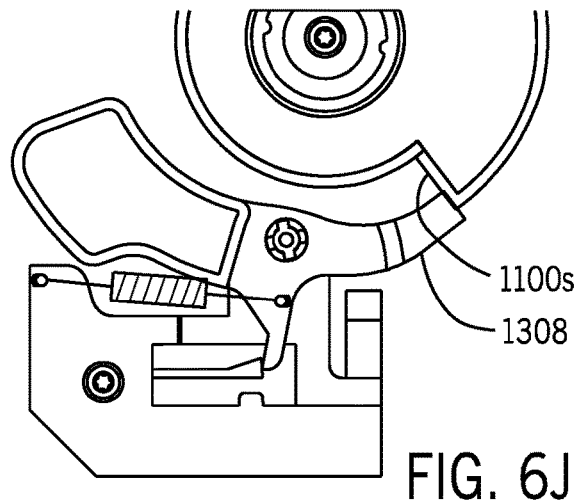
Figure 6K:
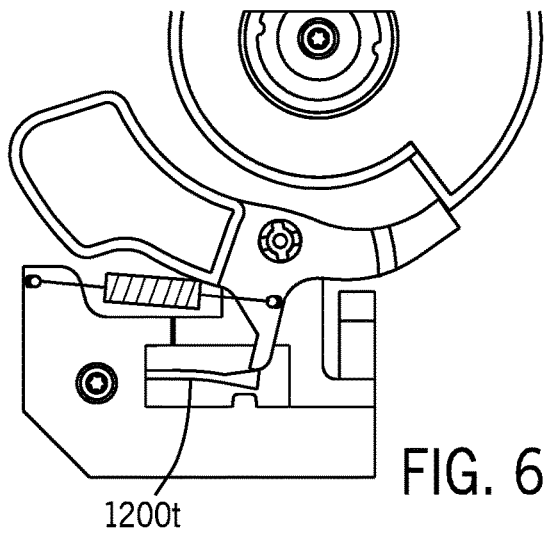
Figure 6L:
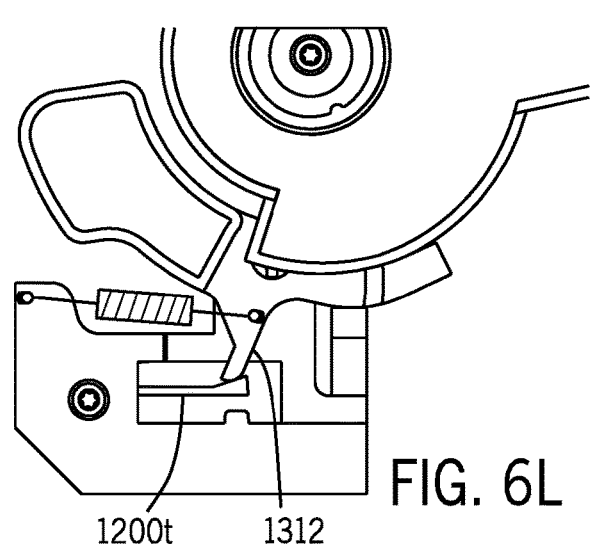
Figure 7A:
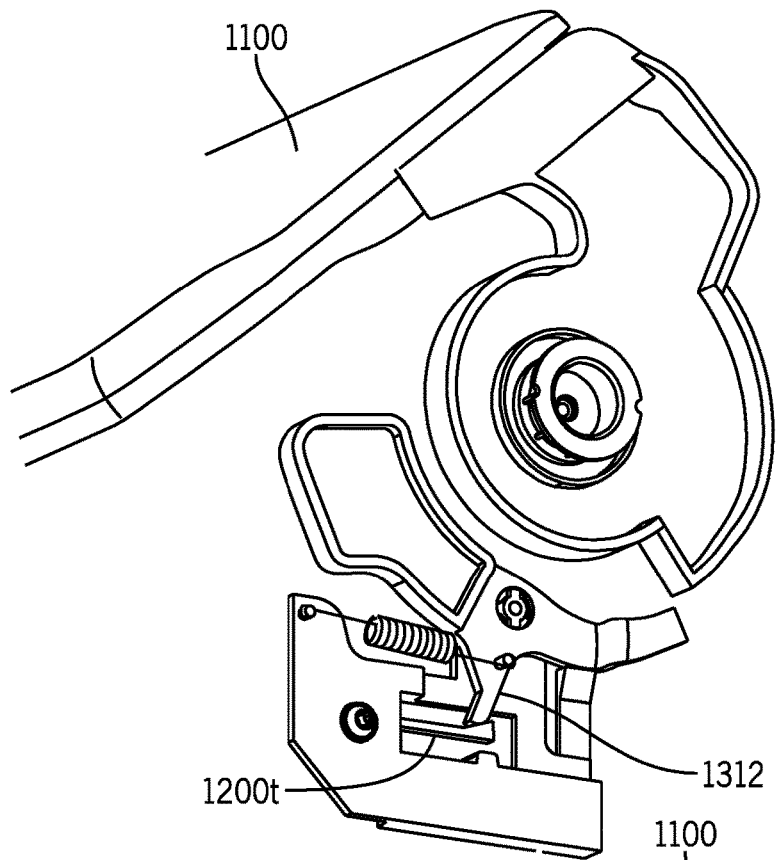
FIGS. 7A and 7B are partial schematic perspective views of a vehicle interior component shown as a console assembly according to an exemplary embodiment.
Figure 7B:
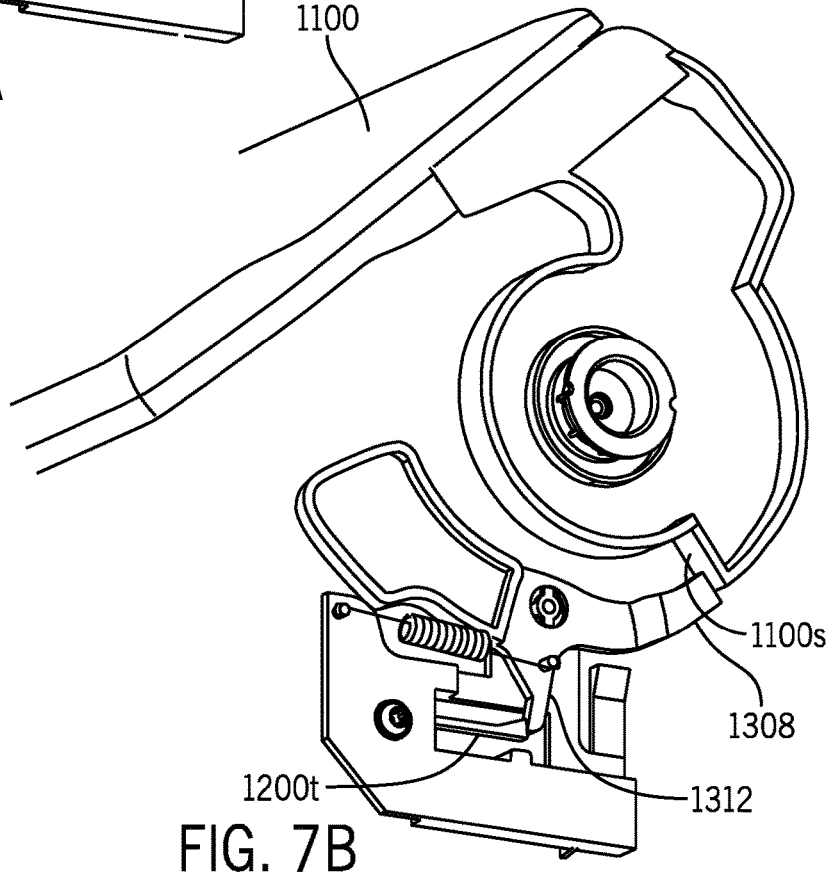
Figure 8A:
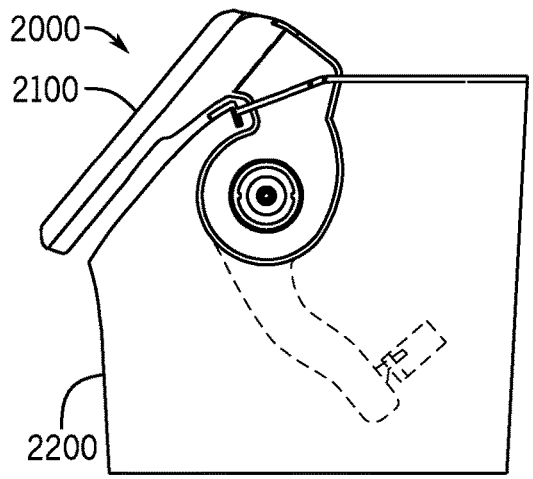
FIGS. 8A through 8F are schematic section views of a conventional vehicle interior component according to an exemplary embodiment.
Figure 8B:
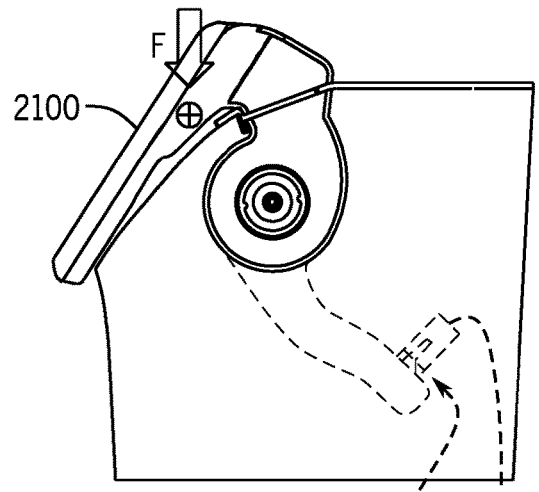
Figure 8C:
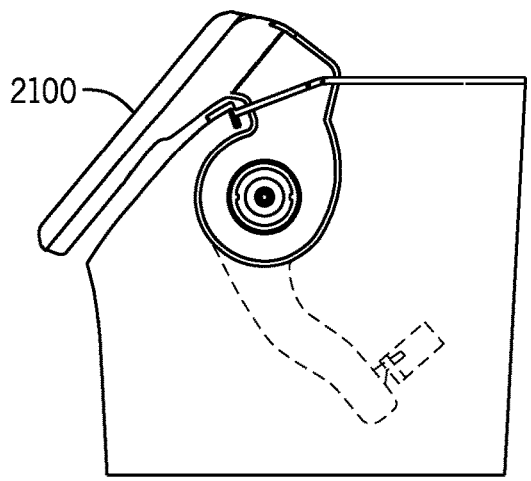
Figure 8D:
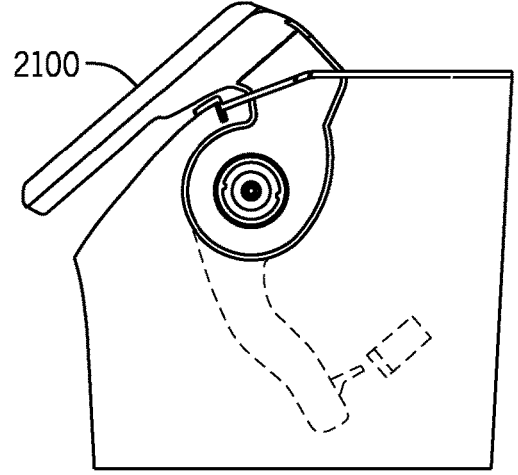
Figure 8E:
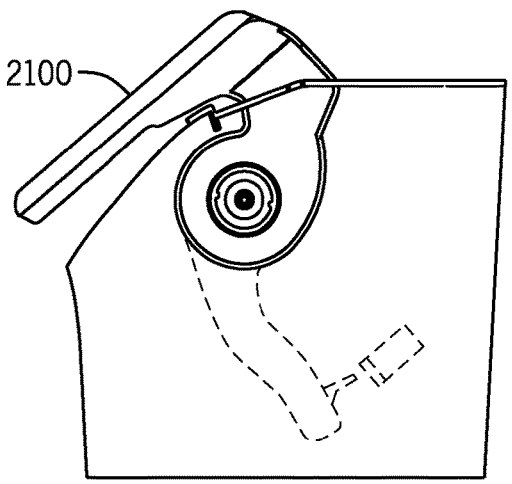
Figure 8F:
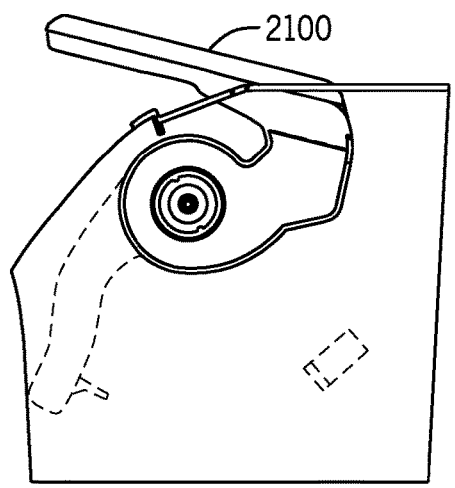
Figure 10A:
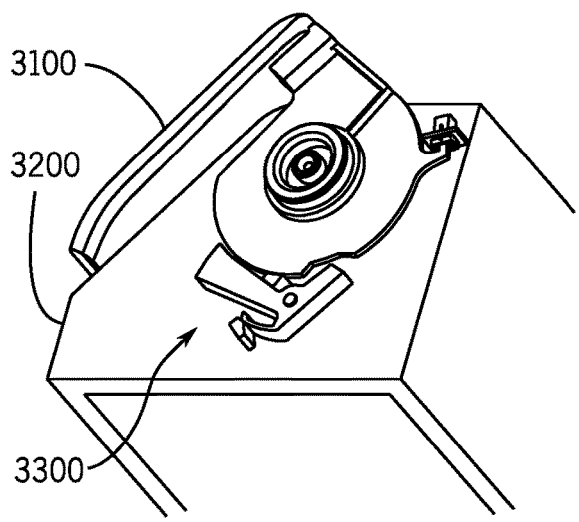
FIGS. 10A through 10F are schematic perspective views of a vehicle interior component shown as a console assembly according to an exemplary embodiment.
Figure 10B:
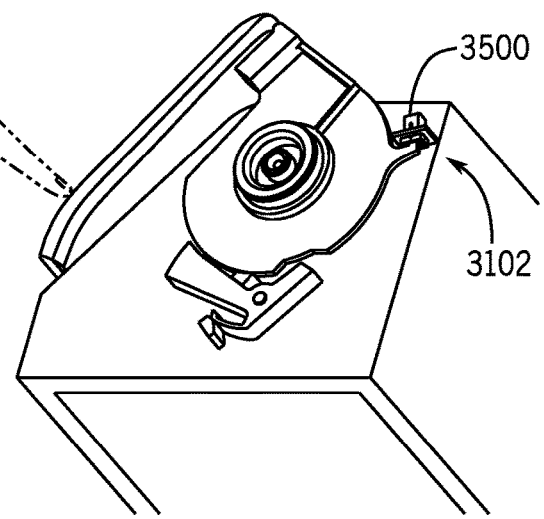
Figure 10C:
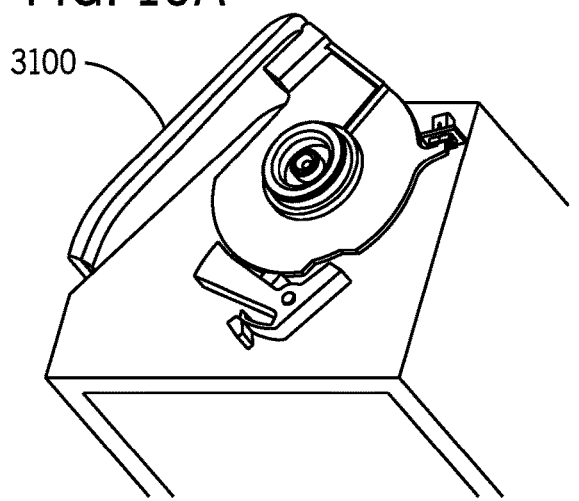
Figure 10D:
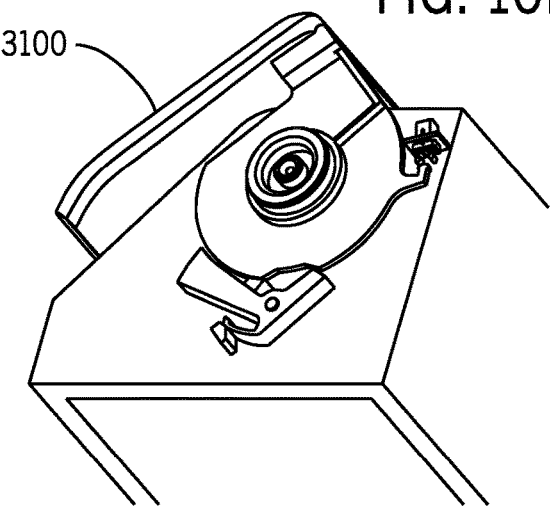
Figure 10E:
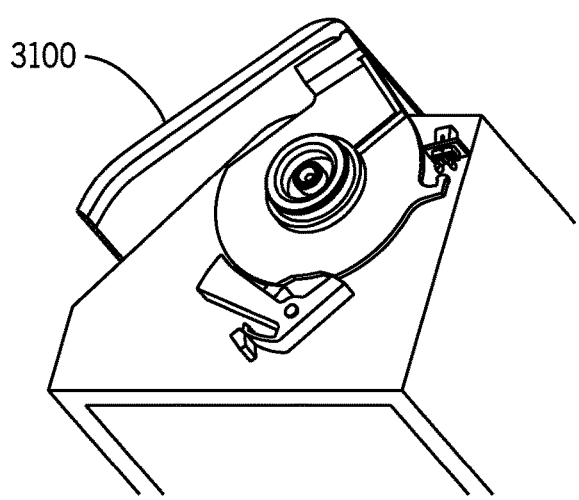
Figure 10F:
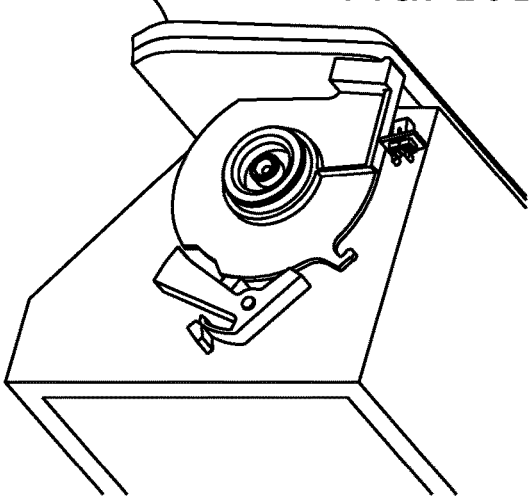
Figure 11A:
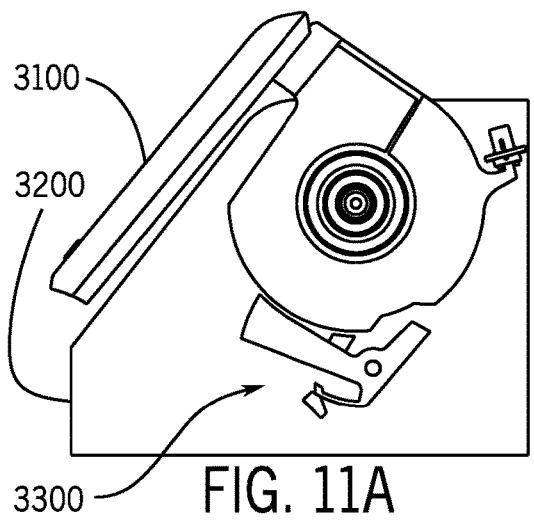
FIGS. 11A through 11F are schematic section views of a vehicle interior component shown as a console assembly according to an exemplary embodiment.
Figure 11B:
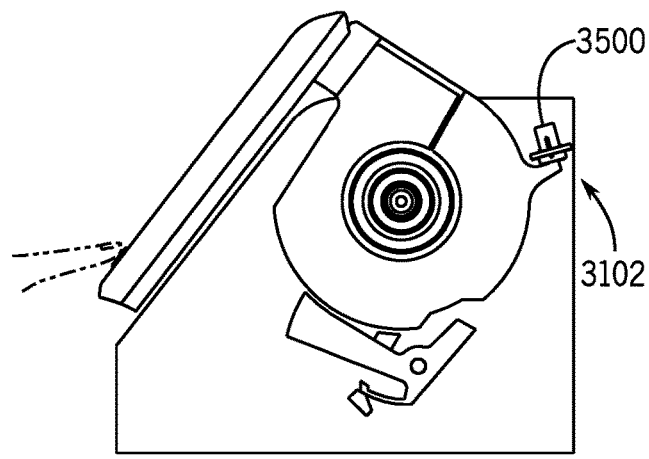
Figure 11C:
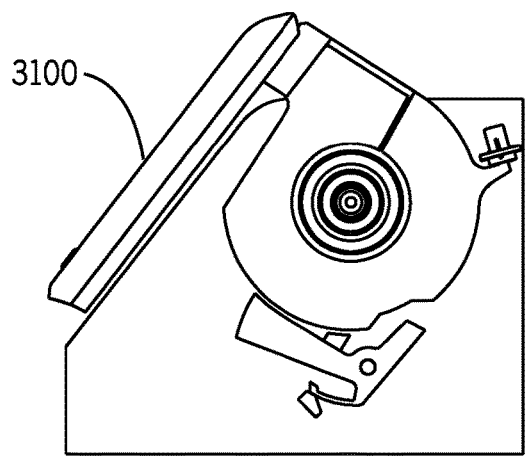
Figure 11D:
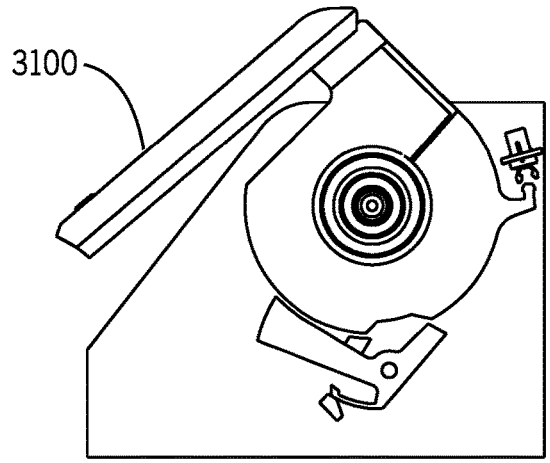
Figure 11E:
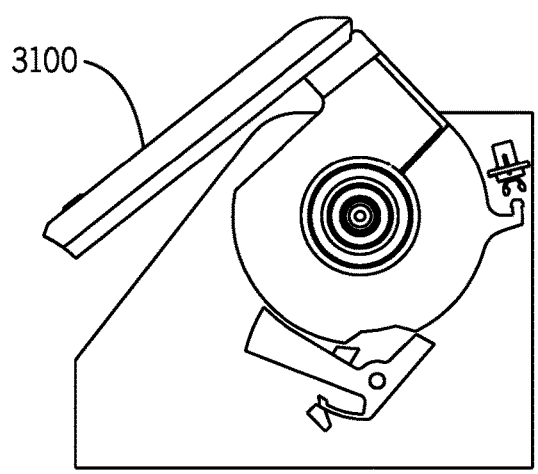
Figure 11F:
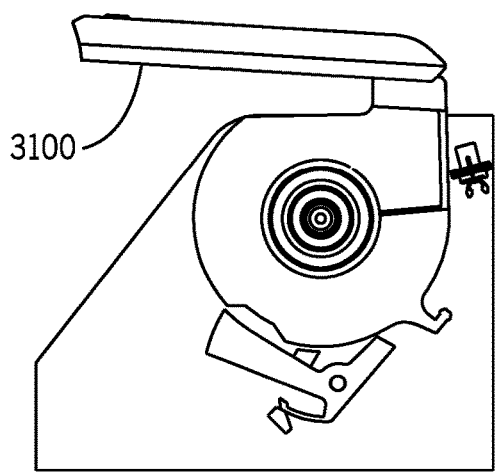
Figure 12A:
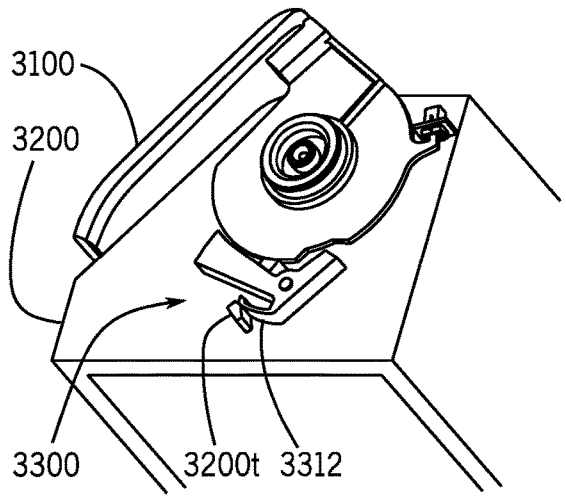
FIGS. 12A through 12F are schematic perspective views of a vehicle interior component shown as a console assembly according to an exemplary embodiment.
Figure 12B:
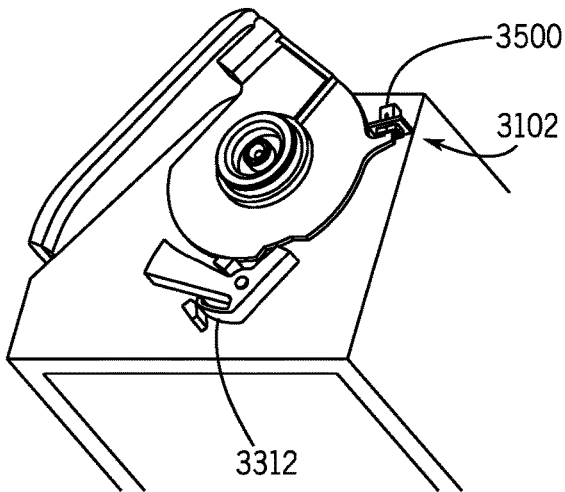
Figure 12C:
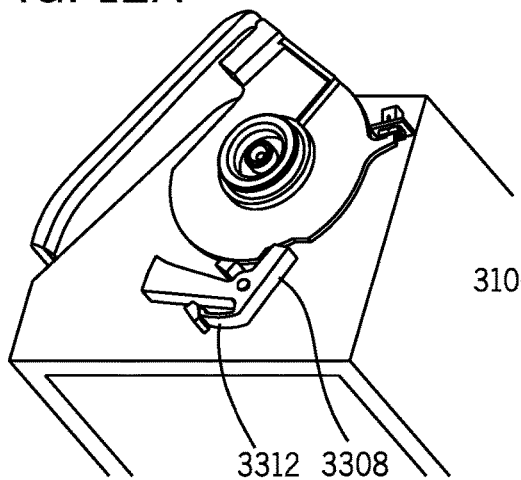
Figure 12D:
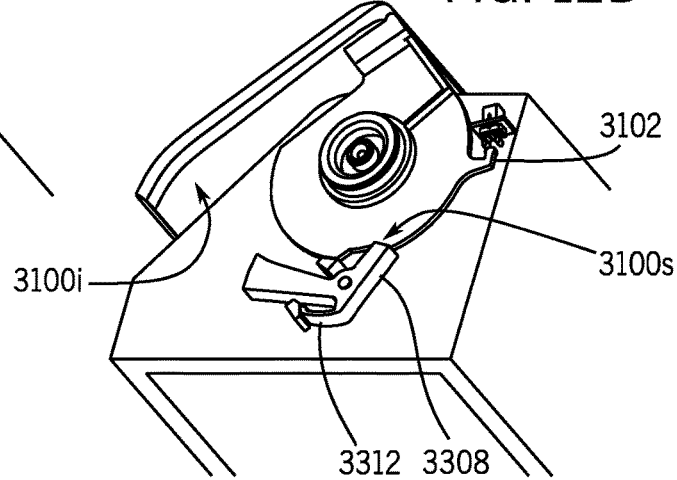
Figure 12E:
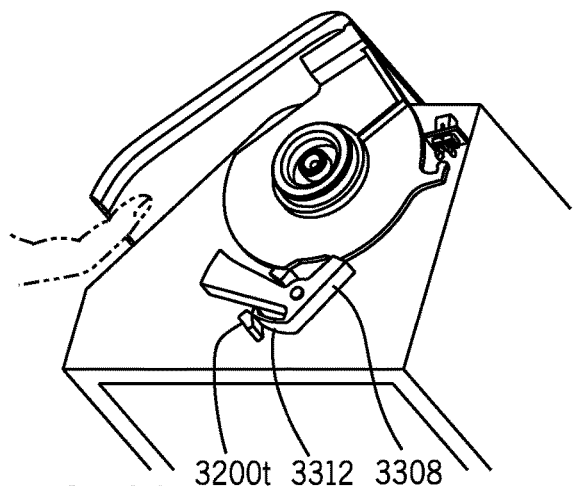
Figure 12F:
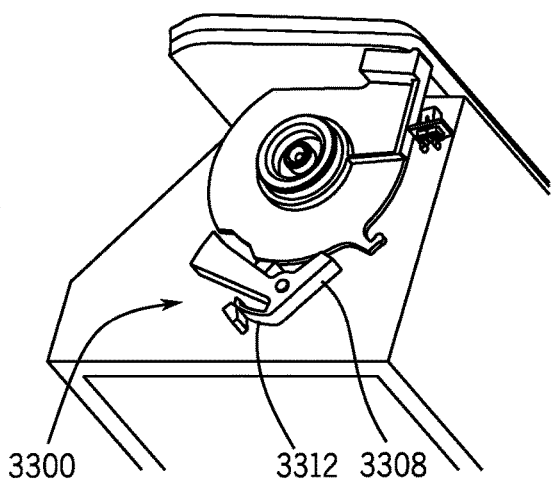
Figure 13A:
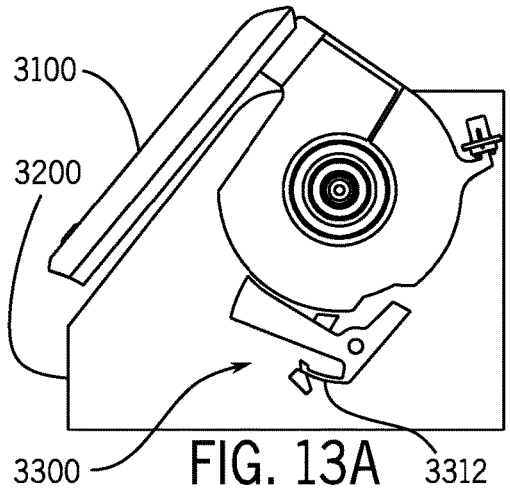
FIGS. 13A through 13F are schematic section views of a vehicle interior component shown as a console assembly according to an exemplary embodiment.
Figure 13B:
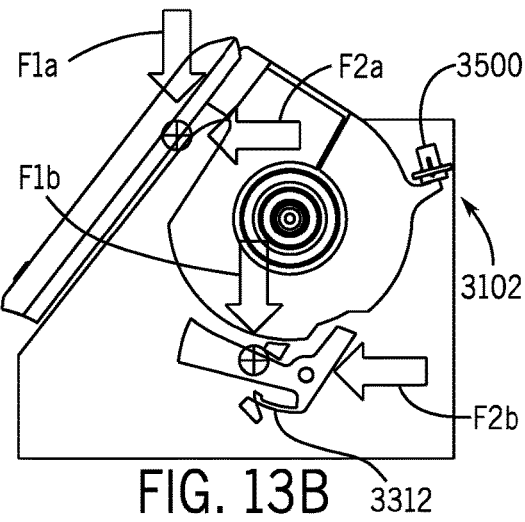
Figure 13C:
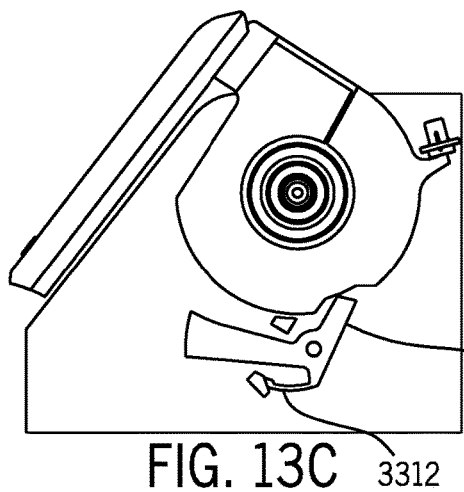
Figure 13D:
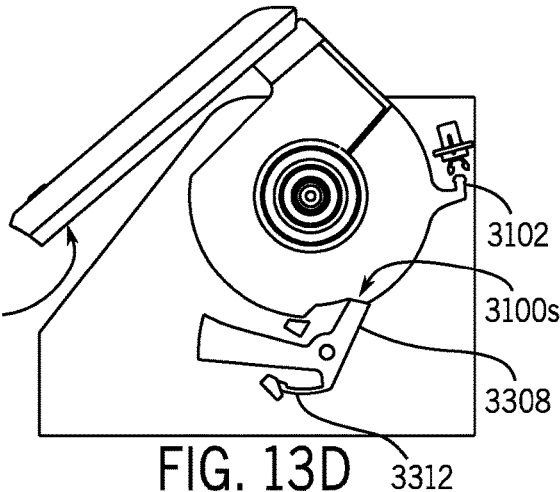
Figure 13E:
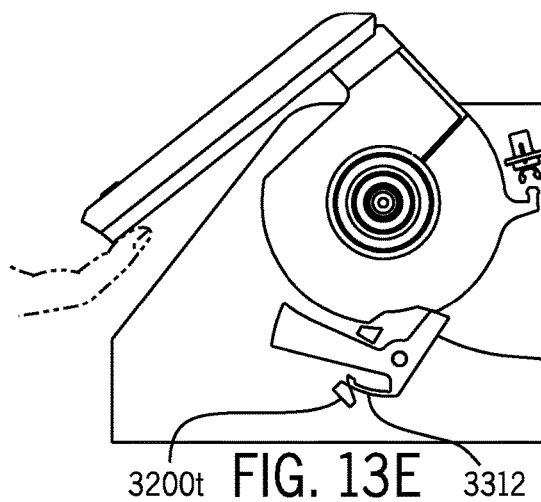
Figure 13F:
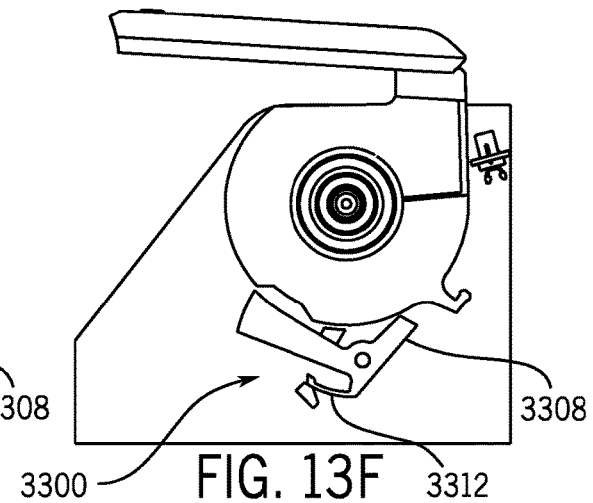
Figure 14A:
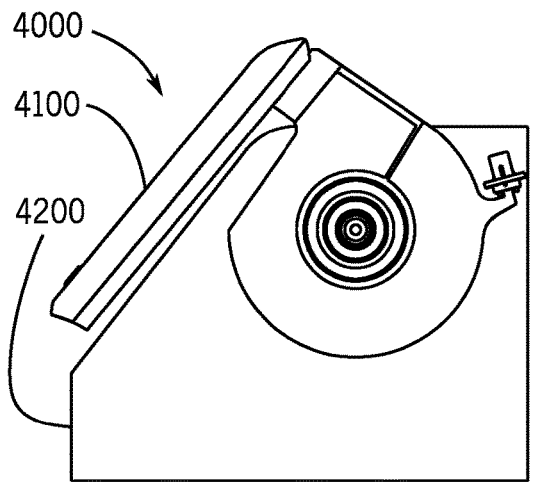
FIGS. 14A through 14F are schematic section views of a conventional vehicle interior component according to an exemplary embodiment.
Figure 14B:
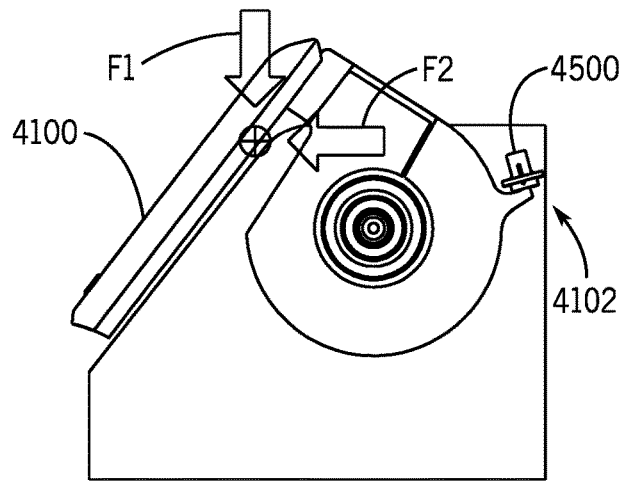
Figure 14C:
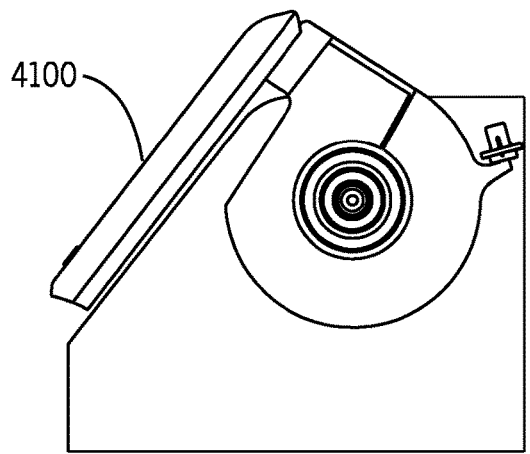
Figure 14D:
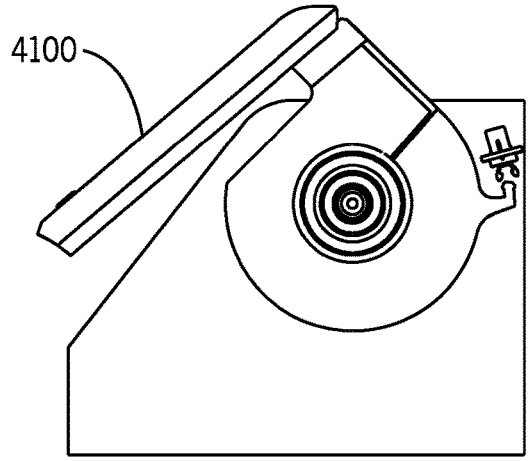
Figure 14E:
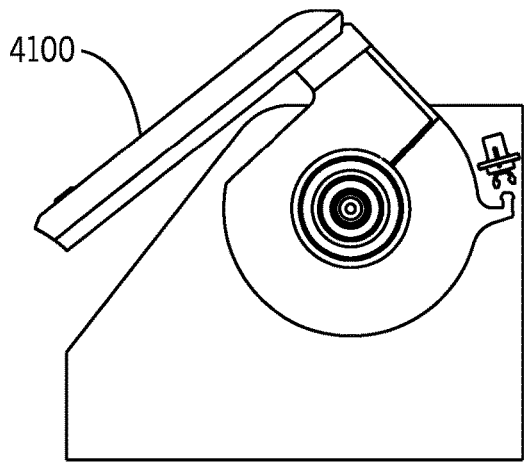
Figure 14F:
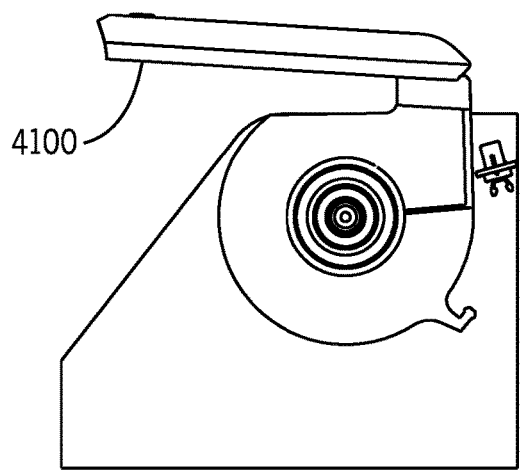
Figure 16A:
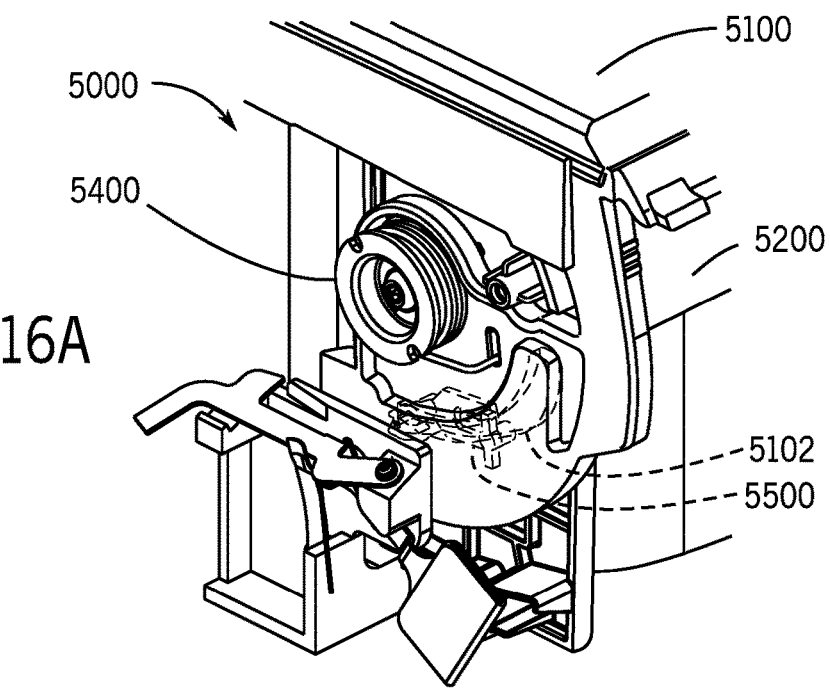
FIG. 16A is a schematic partial perspective view of a vehicle interior component shown as a console assembly according to an exemplary embodiment.
Figure 16B:
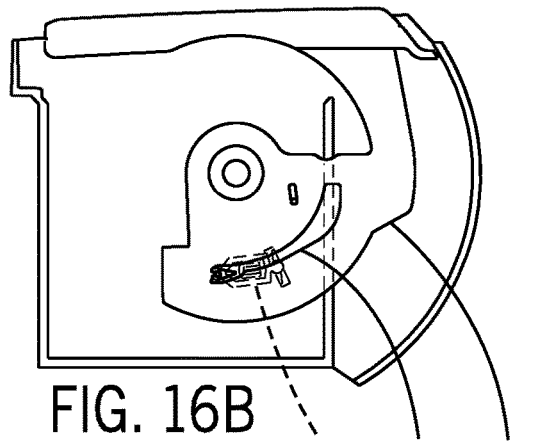
FIGS. 16B through 16E are schematic side views of the operation of a vehicle interior component shown as a console assembly according to an exemplary embodiment.
Figure 16C:
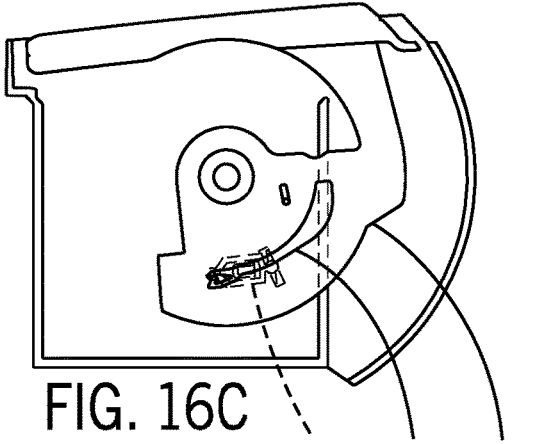
Figure 16D:
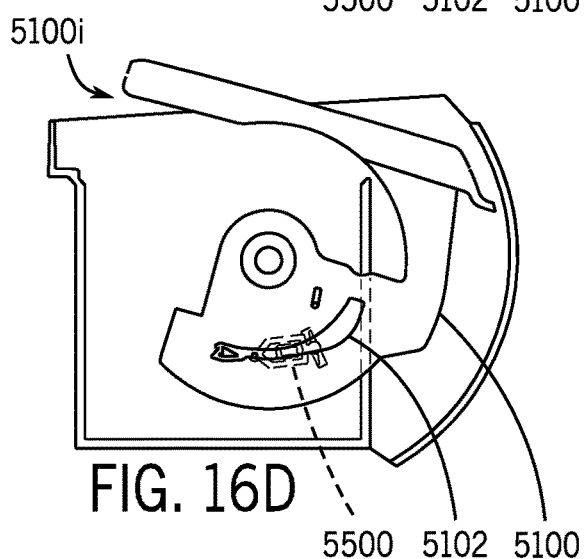
Figure 16E:
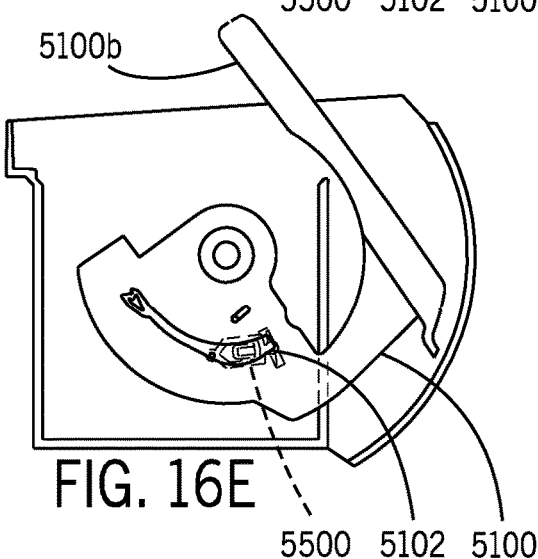

According to an exemplary embodiment as shown schematically in FIGS. 1A through 1H, a vehicle V is shown including an interior I with a vehicle interior component shown as floor console FC. Floor console FC may comprise a base with a storage compartment or bin shown as a storage compartment with an opening and a door configured to be (or provide) a cover C for the compartment. The door or cover C may be configured to move between a closed position as shown schematically in FIG. 1C/1F and an open position as shown schematically in FIG. 1E/1H to facilitate access (through the opening) to the storage compartment.

According to an exemplary embodiment as shown schematically in FIGS. 2A-2B, 3A-3F, 4A-4F, 5A-5F, 6A-6L, 7A-7B, 9, 10A-10F, 11A-11F, 12A-12F, 13A-13F, 15A-15D, 16A-16E, 17A-17D, 18A-18F, 19A-19F, 20A-20F and 21A-21F, a component 1000/3000/5000 for a vehicle interior configured for use in a vehicle subjected in operation to at least one external force such as an applied force may comprise: a base 1200/3200/5200 comprising a bin; a cover 1100/3100/5100 configured to move from (a) a latched position to cover the bin to (b) an open position to uncover the bin through (c) an unlatched position; and a mechanism 1300/3300/5300 configured to hold the cover in a blocked position to prevent the cover from moving from the unlatched position toward the open position. The cover may comprise an interface 1100i/3100i/5100i configured for access when the cover is in the blocked position; the base may be configured to prevent access to the interface when the cover is in the latched position. The mechanism may be configured to move from a retracted position to an extended position to hold the cover in the blocked position. The interface may comprise a surface of the cover facing away from the interior of the vehicle; the cover may be configured to move the mechanism from the extended position to the retracted position in response to an applied force at the interface. The mechanism may comprise a blocker 1308/3308/5308 configured to move from a default position to a blocking position to prevent the cover from moving from the unlatched position to the open position. According to an exemplary embodiment as shown schematically in FIGS. 2A-2B, 3A-3F, 4A-4F, 5A-5F, 6A-6L, 7A-7B, 9, 10A-10F, 11A-11F, 12A-12F and 13A-13F, the blocker 1308/3308 may be configured to slide against the cover 1100/3100 to move from the blocking position to the default position. The cover may comprise a cam surface 1100s/3100s configured to move the blocker. The component 1000/3000/5000 may comprise at least one of (a) a console; (b) a storage compartment; (c) an instrument panel; (d) a floor console; (e) a center console.

According to an exemplary embodiment as shown schematically in FIGS. 2A-2B, 3A-3F, 4A-4F, 5A-5F, 6A-6L, 7A-7B, 9, 10A-10F, 11A-11F, 12A-12F, 13A-13F, 15A-15D, 16A-16E, 17A-17D, 18A-18F, 19A-19F, 20A-20F and 21A-21F, a component 1000/3000/5000 for a vehicle interior configured for use in a vehicle subjected in operation to at least one external force such as an applied force may comprise: a base 1200/3200/5200 comprising a bin; a cover 1100/3100/5100 configured to move from (a) a latched position to cover the bin to (b) an open position to uncover the bin through (c) an unlatched position; and a mechanism 1300/3300/5300 configured to move from a retracted position to an extended position to hold the cover in a blocked position. The cover may be configured to move the mechanism from the extended position toward the retracted position. The cover may be configured to move the mechanism when the cover is moved by an external force from the blocked position toward the open position. According to an exemplary embodiment as shown schematically in FIGS. 2A-2B, 3A-3F, 4A-4F, 5A-5F, 6A-6L, 7A-7B, 9, 10A-10F, 11A-11F, 12A-12F and 13A-13F, the mechanism 1100/3100 may comprise a blocker 1308/3308 configured to contact a cam surface 1100s/3300s of the cover 1100/3100 to hold the cover in the blocked position. The mechanism may comprise an arm 1312/3312 configured to move from a biased position to a rotated position to prevent the cover from moving from the unlatched position to the open position. According to an exemplary embodiment as shown schematically in FIGS. 2A-2B, 3A-3F, 4A-4F, 5A-5F, 6A-6L and 7A-7B, the base 1200 may comprise a tab 1200t configured to move to allow the blocker 1308 to move into engagement with the cover 1100 to hold the cover in the blocked position. The mechanism 1300 may comprise a spring 1316 configured to bias the blocker. The mechanism 1300 may comprise an arm 1312 configured to move from a biased position to a rotated position to prevent the cover 1100 from moving toward the open position.

According to an exemplary embodiment as shown schematically in FIGS. 2A-2B, 3A-3F, 4A-4F, 5A-5F, 6A-6L, 7A-7B, 9, 10A-10F, 11A-11F, 12A-12F, 13A-13F, 15A-15D, 16A-16E, 17A-17D, 18A-18F, 19A-19F, 20A-20F and 21A-21F, a component 1000/3000/5000 for a vehicle interior configured for use in a vehicle subjected in operation to at least one external force such as an applied force may comprise: a base 1200/3200/5200 comprising a bin; a cover 1100/3100/5100 configured to move from (a) a latched position to cover the bin to (b) an open position to uncover the bin through (c) an unlatched position; and a mechanism 1300/3300/5300 configured to hold the cover in a blocked position to prevent the cover from moving from the unlatched position toward the open position. The mechanism may be configured to move from a retracted position to an extended position to hold the cover in the blocked position. According to an exemplary embodiment as shown schematically in FIGS. 2A-2B, 3A-3F, 4A-4F, 5A-5F, 6A-6L, 7A-7B, 9, 10A-10F, 11A-11F, 12A-12F and 13A-13F, the base 1200/3200 may comprise a tab 1200t/3200t configured to (a) hold the mechanism 1300/3300 in the retracted position; (b) hold the mechanism in the extended position. According to an exemplary embodiment as shown schematically in FIGS. 2A-2B, 3A-3F, 4A-4F, 5A-5F, 6A-6L, 7A-7B, the tab 1200t may be configured to deflect to allow the mechanism 1300 to move between the retracted position and the extended position. The cover 1100 may be configured to move the tab 1200t as the cover moves from the blocked position toward the open position. The cover may be configured to deflect the tab to move the mechanism from the extended position toward the retracted position. According to an exemplary embodiment as shown schematically in FIGS. 2A-2B, 3A-3F, 4A-4F, 5A-5F, 6A-6L, 7A-7B, 9, 10A-10F, 11A-11F, 12A-12F and 13A-13F, the cover 1100/3100 may be configured to move directly from the blocked position toward the open position. According to an exemplary embodiment as shown schematically in FIGS. 2A-2B, 3A-3F, 4A-4F, 5A-5F, 6A-6L, 7A-7B, the component 1000 may comprise a bracket 1210 coupled to the base 1200; the bracket may comprise the tab 1200t.

According to an exemplary embodiment as shown schematically in FIGS. 2A-2B, 3A-3F, 4A-4F, 5A-5F, 6A-6L and 7A-7B, a vehicle interior component 1000 shown as a console may comprise a cover 1100, a base 1200 and a mechanism 1300. Cover 1100 may be coupled to base 1200 and may be configured for movement from a closed or latched position (as shown schematically in FIGS. 3A, 4A, 5A and 6A) to an open position (as shown schematically in FIGS. 3F, 4F, 5F and 6F) through an unlatched position (as shown schematically in FIGS. 3B, 4B, 5B and 6B) in response to an external force. The external force may be supplied by an occupant as shown schematically in FIGS. 3B and 4B. According to an exemplary embodiment, base 1200 may comprise a bin/storage compartment SC and cover 1100 may be configured to cover the bin/storage compartment in the closed or latched position (as shown schematically in FIGS. 3A, 4A, 5A and 6A) and uncover the bin/storage compartment in the open position (as shown schematically in FIGS. 3F, 4F, 5F and 6F). Cover 1100 may comprise a door. Mechanism 1300 may be configured to move from a retracted position (as shown schematically in FIGS. 3A-3F, 4A-4F, 5A, 6A and 6G) to an extended position (as shown schematically in FIGS. 5D, 6D and 6J) to prevent cover 1100 from moving from the unlatched position toward the open position in response to an inertia force as shown schematically in FIGS. 6B and 6H as force F. Vehicle interior component 1000 may comprise a spring 1400 configured to move door 1100 from the closed or latched position to the open position. Spring 1400 may be configured to move door 1100 from the unlatched position to the open position. Cover 1100 may comprise a trigger 1102; base 1200 may comprise a catch 1500 for trigger 1102 to retain cover 1100 to base 1200. Cover 1100 may comprise a cam surface 1100s. Mechanism 1300 may comprise a blocking mechanism. Mechanism 1300 may remain in the retracted position during normal operation of cover 1100. Mechanism 1300 may be set to the extended position to block opening of cover 1100 in response to an inertia force on cover 1100. Mechanism 1300 may be re-set by opening cover 1100 (e.g. opening by a vehicle occupant). Mechanism 1300 may comprise a blocker 1308. Blocker 1308 may comprise a projection. Mechanism 1300 may comprise an arm 1312. Arm 1312 and blocker 1308 may comprise a unitary component. Base 1200 may comprise a tab 1200t. Vehicle interior component 1000 may comprise at least one fastener Fa to join cover 1100 and base 1200. Vehicle interior component 1000 may comprise a bracket 1210 and may comprise at least one fastener Fa to join bracket 1210 and base 1200. Bracket 1210 may comprise tab 1200t. Bracket 1210 may comprise a stop 1210s. According to an exemplary embodiment as shown schematically in FIG. 2B, mechanism 1300 may comprise a tab 1200t, a blocker 1308 and an arm 1312. Mechanism 1300 may comprise a bracket 1210; bracket 1210 may comprise tab 1200t. Bracket 1210 may comprise a stop 1210*s* for blocker 1308. Mechanism 1300 may comprise a cam surface 1100*s*. Cover 1100 may comprise cam surface 1100*s*. Mechanism 1300 may comprise a spring 1316. Spring 1316 may comprise a coil spring. Spring 1316 may be configured to bias blocker 1308 and/or arm 1312. Mechanism 1300 may comprise a mechanism assembly.

According to an exemplary embodiment as shown schematically in FIGS. 3A through 3F and 4A through 4F, a vehicle interior component 1000 shown as a console may comprise a cover 1100 and a base 1200. Cover 1100 may be coupled to base 1200 and may be configured for movement between a closed or latched position and an open position in response to an external force. According to an exemplary embodiment, base 1200 may comprise a bin or storage compartment and cover 1100 may be configured to cover the bin or storage compartment in the closed or latched position as shown schematically in FIGS. 3A and 4A and uncover the bin or storage compartment in the open position as shown schematically in FIGS. 3F and 4F. Cover 1100 may comprise a door. Cover 1100 may comprise a trigger 1102 and base 1200 may comprise a catch 1500. Trigger 1102 may engage catch 1500 to retain cover 1100 in the closed or latched position as shown schematically in FIGS. 3A and 4A. By application of an external force, cover 1100 may be rotated/pushed (e.g. downward) toward an unlatched position and trigger 1102 may disengage catch 1150 as shown schematically in FIGS. 3B and 4B. Cover 1100 may comprise an interface 1100*i*. Base 1200 may be configured to prevent access to interface 1100*i* when cover 1100 is in the closed or latched position. Interface 1100*i* may be configured for access in response to an inertia force as shown schematically in FIGS. 5D and 6D. Cover 1100 may comprise a bottom surface facing away from the interior of the vehicle when cover 1100 is in the closed or latched position. The bottom surface of cover 1100 may be configured for access in response to an inertia force as shown schematically in FIGS. 5D and 6D.

According to an exemplary embodiment as shown schematically in FIGS. 1C-1E, 2A-2B, 3A-3F, 4A-4F, 5A-5F, 6A-6L and 7A-7B, a component FC/1000 for a vehicle interior may be configured for use in a vehicle subjected in operation to at least one external force such as an applied force and may comprise a base 1200 comprising a bin or storage compartment SC; a cover C/1100 configured to move from (a) a latched position to cover the bin to (b) an open position to uncover the bin through (c) an unlatched position; and a mechanism 1300 configured to move from a retracted position to an extended position to prevent cover 1100 from moving from the unlatched position toward the open position. Mechanism 1300 may be configured to move from the retracted position to the extended position in response to the applied force exceeding a predetermined amount. Base 1200 may be configured to cover mechanism 1300 when cover 1100 is in the latched position; the unlatched position; and the open position. Mechanism 1300 may be configured to hold cover 1100 in a blocked position. Cover 1100 may be configured to (a) move in a closing direction from the latched position to the unlatched position; (b) move in an opening direction from the unlatched position through the latched position toward the blocked position. Cover 1100 may comprise a bottom surface or interface 1100*i* facing away from the interior of the vehicle when cover 1100 is in the latched position; bottom surface/interface 1100*i* of cover 1100 may be configured for access when cover 1100 is in the blocked position. Cover 1100 may comprise a bottom surface or interface 1100*i*; interface 1100*i* may be configured for access when cover 1100 is in the blocked position; base 1200 may be configured to prevent access to interface 1100*i* when cover 1100 is in the latched position. Cover 1100 may be configured to partially uncover the bin when cover 1100 is in the blocked position. Cover 1100 may be configured to move mechanism 1300 from the extended position toward the retracted position. Cover 1100 may be configured to move mechanism 1300 when cover 1100 is moved by an external force from the blocked position toward the open position. Mechanism 1300 may comprise a blocker 1308 configured to move from a default position to a blocking position to prevent cover 1100 from moving from the unlatched position to the open position. Blocker 1308 may be configured to move from the blocking position to the default position in response to an applied force on blocker 1308. Blocker 1308 may be configured to slide against cover 1100 to move from the blocking position to the default position. Cover 1100 may comprise a cam surface 1100*s* configured to move blocker 1308. Cover 1100 may be configured to move blocker 1308 from the blocking position toward the default position. Cover 1100 may be configured to move blocker 1308 when cover 1100 is moved by an external force from the blocked position toward the open position. Mechanism 1300 may comprise an arm 1312 configured to move from a biased position to a rotated position to prevent cover 1100 from moving from the unlatched position to the open position. Arm 1312 may be configured to move to the rotated position to move blocker 1308 from the default position to the blocking position. Arm 1312 and blocker 1308 may comprise a unitary component. Base 1200 may comprise a tab 1200*t* configured to move as arm 1312 moves between the biased position and the rotated position. Base 1200 may comprise a tab 1200*t* configured to deflect to allow arm 1312 to move between the biased position and the rotated position. Base 1200 may comprise a tab 1200*t* configured to hold arm 1312 in the rotated position. Component 1000 may comprise a bracket 1210 coupled to base 1200; bracket 1210 may comprise tab 1200*t*. Bracket 1210 may comprise a stop 1210*s* for blocker 1308. Cover 1100 may be configured to deflect tab 1200*t* to move arm 1312 from the rotated position toward the biased position. Base 1200 may comprise a tab 1200*t* configured to hold arm 1312 in the biased position. Cover 1100 may be configured to move arm 1312 from the rotated position to the biased position. Cover 1100 may be configured to move arm 1312 when cover 1100 is moved by an external force from the blocked position toward the open position. Mechanism 1300 may comprise a spring 1316 configured to bias blocker 1308 in the default position. Spring 1316 may comprise a coil spring. Mechanism 1300 may be configured to hold cover 1100 in a blocked position in response to the force exceeding the predetermined amount. Mechanism 1300 may comprise an inertia latch. The applied force may comprise an inertial force. Cover 1100 may comprise at least one of (a) a door; (b) a rotatable door. Component 1000 may comprise at least one of (a) a console; (b) a storage compartment; (c) an instrument panel; (d) a floor console; (e) a center console.

According to an exemplary embodiment as shown schematically in FIGS. 8A through 8F, a conventional vehicle interior component 2000 may comprise a cover 2100 and a base 2200. Cover 2100 may be coupled to base 2200 and may be configured for movement between a closed position and an open position in response to an external force. According to an exemplary embodiment, base 2200 may comprise a storage compartment and cover 2100 may be configured to cover the storage compartment in the closed position and uncover the storage compartment in the open position. By application of an external force F1 or F2 acting against the center of gravity of cover 2100, cover 2100 may be rotated (e.g. downward) toward an unlatched position and a conventional spring may provide a force to move cover 2100 from the unlatched position toward an open position.

According to an exemplary embodiment as shown schematically in FIGS. 9, 10A-10F, 11A-11F, 12A-12F and 13A-13F, a vehicle interior component 3000 shown as a console may comprise a cover 3100, a base 3200 and a mechanism 3300. Cover 3100 may be coupled to base 3200 and may be configured for movement from a closed or latched position (as shown schematically in FIGS. 10A, 11A, 12A and 13A) to an open position (as shown schematically in FIGS. 10F, 11F, 12F and 13F) through an unlatched position (as shown schematically in FIGS. 10B, 11B, 12B and 13B) in response to an external force. The external force may be supplied by an occupant as shown schematically in FIGS. 10B and 11B. According to an exemplary embodiment, base 3200 may comprise a bin/storage compartment SC and cover 3100 may be configured to cover the bin/storage compartment in the closed or latched position (as shown schematically in FIGS. 10A, 11A, 12A and 13A) and uncover the bin/storage compartment in the open position (as shown schematically in FIGS. 10F, 11F, 12F and 13F). Cover 3100 may comprise a door. Mechanism 3300 may be configured to move from a retracted position (as shown schematically in FIGS. 10A-10F, 11A-11F, 12A and 13A) to an extended position (as shown schematically in FIGS. 12D and 13D) to prevent cover 3100 from moving from the unlatched position toward the open position in response to an inertia force as shown schematically in FIG. 13B as force F1$a$/F1$b$ or F2$a$/F2$b$. Vehicle interior component 3000 may comprise a spring 3400 configured to move door 3100 from the closed or latched position to the open position. Spring 3400 may be configured to move door 3100 from the unlatched position to the open position. Cover 3100 may comprise a trigger 3102; base 3200 may comprise a catch 3500 for trigger 3102 to retain cover 3100 to base 3200. Cover 3100 may comprise a cam surface 3100$s$. Mechanism 3300 may comprise a blocking mechanism. Mechanism 3300 may comprise an assembly. Mechanism 3300 may remain in the retracted position during normal operation of cover 3100. Mechanism 3300 may be set to the extended position to block opening of cover 3100 in response to an inertia force on cover 3100. Mechanism 3300 may be re-set by opening cover 3100 (e.g. opening by a vehicle occupant). Mechanism 3300 may comprise a blocker 3308. Blocker 3308 may comprise a projection. Mechanism 3300 may comprise an arm 3312. Arm 3312 and blocker 3308 may comprise a unitary component. Base 3200 may comprise a tab 3200$t$. Vehicle interior component 3000 may comprise at least one fastener 3600 to join cover 3100 and base 3200.

According to an exemplary embodiment as shown schematically in FIGS. 10A through 10F and 11A through 11F, a vehicle interior component 3000 shown as a console may comprise a cover 3100 and a base 3200. Cover 3100 may be coupled to base 3200 and may be configured for movement between a closed or latched position and an open position in response to an external force. According to an exemplary embodiment, base 3200 may comprise a bin or storage compartment and cover 3100 may be configured to cover the bin or storage compartment in the closed or latched position as shown schematically in FIGS. 10A and 11A and uncover the bin or storage compartment in the open position as shown schematically in FIGS. 10F and 11F. Cover 3100 may comprise a door. Cover 3100 may comprise a trigger 3102 and base 3200 may comprise a catch 3500. Trigger 3102 may engage catch 3500 to retain cover 3100 in the closed or latched position as shown schematically in FIGS. 10A and 11A. By application of an external force, cover 3100 may be rotated/pushed (e.g. downward) toward an unlatched position and trigger 3102 may disengage catch 3500 as shown schematically in FIGS. 10B and 11B. Cover 3100 may comprise an interface 3100$i$. Base 3200 may be configured to prevent access to interface 3100$i$ when cover 3100 is in the closed or latched position. Interface 3100$i$ may be configured for access in response to an inertia force as shown schematically in FIGS. 12D and 13D. Cover 3100 may comprise a bottom surface facing away from the interior of the vehicle when cover 3100 is in the closed or latched position. The bottom surface of cover 3100 may be configured for access in response to an inertia force as shown schematically in FIGS. 12D and 13D.

According to an exemplary embodiment as shown schematically in FIGS. 9, 10A-10F, 11A-11F, 12A-12F and 13A-13F, a component 3000 for a vehicle interior configured for use in a vehicle subjected in operation to at least one external force such as an applied force may comprise: a base 3200 comprising a bin SC; a cover 3100 configured to move from (a) a latched position (as shown schematically in FIGS. 10A, 11A, 12A and 13A) to cover the bin to (b) an open position (as shown schematically in FIGS. 10F, 11F, 12F and 13F) to uncover the bin through (c) an unlatched position (as shown schematically in FIGS. 10B, 11B, 12B and 13B); and a mechanism 3300 configured to move from a retracted position (as shown schematically in FIGS. 10A-10F, 11A-11F, 12A and 13A) to an extended position (as shown schematically in FIGS. 12D and 13D) to prevent cover 3100 from moving from the unlatched position toward the open position. Mechanism 3300 may be configured to move from the retracted position to the extended position in response to the applied force exceeding a predetermined amount. Base 3200 may be configured to cover mechanism 3300 when cover 3100 is in the latched position; the unlatched position; and the open position. Mechanism 3300 may be configured to hold cover 3100 in a blocked position (as shown schematically in FIGS. 12D and 13D). Cover 3100 may be configured to (a) move in a closing direction from the latched position to the unlatched position; (b) move in an opening direction from the unlatched position through the latched position toward the blocked position. Cover 3100 may comprise a bottom surface facing away from the interior of the vehicle when cover 3100 is in the latched position; the bottom surface of cover 3100 may be configured for access when cover 3100 is in the blocked position (as shown schematically in FIGS. 12D and 13D). Cover 3100 may comprise an interface 3100$i$; interface 3100$i$ may be configured for access when cover 3100 is in the blocked position; base 3200 may be configured to prevent access to interface 3100$i$ when cover 3100 is in the latched position. Cover 3100 may be configured to partially uncover the bin when cover 3100 is in the blocked position. Cover 3100 may be configured to move mechanism 3300 from the extended position toward the retracted position as shown schematically in FIGS. 12D-12F and 13D-13F. Cover 3100 may be configured to move mechanism 3300 when cover 3100 is moved by an external force from the blocked position toward the open position. Mechanism 3300 may comprise a blocker 3308 configured to move from a default position (as shown schematically in FIGS. 10A-10F, 11A-11F, 12A and 13A) to a blocking position (as shown schematically in FIGS. 12D and 13D) to prevent cover 3100 from moving from the unlatched position to the open position. Blocker 3308 may be configured to move from the blocking position to the default position in response to an applied force on blocker 3308. Blocker 3308 may be configured to slide against cover 3100 to move from the blocking position to the default position as shown schematically in FIGS. 12D-12F and 13D-13F. Cover 3100 may comprise a cam surface 3100s configured to move blocker 3308. Cover 3100 may be configured to move blocker 3308 from the blocking position toward the default position. Cover 3100 may be configured to move blocker 3308 when cover 3100 is moved by an external force from the blocked position toward the open position. Mechanism 3300 may comprise an arm 3312 configured to move from a biased position to a rotated position to prevent cover 3100 from moving from the unlatched position to the open position as shown schematically in FIGS. 12A-12D and 13A-13D. Arm 3312 may be configured to move relative to blocker 3308 in response to the applied force exceeding the predetermined amount to allow blocker 3308 to move from the default position to the blocking position. Arm 3312 and blocker 3308 comprise a unitary component. Arm 3312 may be configured to deflect as arm 3312 moves between the biased position and the rotated position. Base 3200 may comprise a tab 3200t configured to move arm 3312 between the biased position and the rotated position. Base 3200 may comprise a tab 3200t configured to hold arm 3312 in the biased position and the rotated position. Cover 3100 may be configured to move arm 3312 from the rotated position to the biased position as shown schematically in FIGS. 12D-12F and 6D-6F. Cover 3100 may be configured to move arm 3312 when cover 3100 is moved by an external force from the blocked position toward the open position. Mechanism 3300 may be configured to hold cover 3100 in a blocked position in response to the force exceeding the predetermined amount. The applied force may comprise an inertia force. Cover 3100 may comprise at least one of (a) a door; (b) a rotatable door. Component 3000 may comprise at least one of (a) a console; (b) a storage compartment; (c) an instrument panel; (d) a floor console; (e) a center console.

According to an exemplary embodiment as shown schematically in FIGS. 14A through 14F, a conventional vehicle interior component 4000 may comprise a cover 4100 and a base 4200. Cover 4100 may be coupled to base 4200 and may be configured for movement between a closed position and an open position in response to an external force. According to an exemplary embodiment, base 4200 may comprise a storage compartment and cover 4100 may be configured to cover the storage compartment in the closed position and uncover the storage compartment in the open position. By application of an external force F1 or F2 acting against the center of gravity of cover 4100, cover 4100 may be rotated (e.g. downward) toward an unlatched position and a conventional spring may provide a force to move cover 4100 from the unlatched position toward an open position.

According to an exemplary embodiment as shown schematically in FIGS. 15A through 15D, a vehicle interior component 5000 shown as a console may comprise a cover 5100 and a base 5200. Cover 5100 may be coupled to base 5200 and may be configured for movement between a closed or latched position and an open position in response to an external force. According to an exemplary embodiment, base 5200 may comprise a bin or storage compartment SC and cover 5100 may be configured to cover bin or storage compartment SC in the closed or latched position as shown schematically in FIG. 15A and uncover bin or storage compartment SC in the open position as shown schematically in FIG. 15D. Cover 5100 may comprise a door.

According to an exemplary embodiment as shown schematically in FIGS. 16A through 16E, cover 5100 may comprise a slot 5102 and base 5200 may comprise a catch 5500. Catch 5500 may engage with a protrusion in slot 5102 to retain cover 5100 in the closed or latched position as shown schematically in FIGS. 16A and 16B. By application of an external force, cover 5100 may be rotated/pushed (e.g. downward) toward an unlatched position and catch 5500 may disengage the protrusion in slot 5102 as shown schematically in FIG. 16C. Catch 5500 may move along slot 5102 as cover 5100 moves from the unlatched position toward an open position. (See FIGS. 16D and 16E.) Cover 5100 may comprise an interface 5100i. Base 5200 may be configured to prevent access to interface 5100i when cover 5100 is in the closed or latched position. Interface 5100i may be configured for access as shown schematically in FIGS. 16D and 16E. Cover 5100 may comprise a bottom surface 5100b facing away from the interior of the vehicle when cover 5100 is in the closed or latched position. Bottom surface 5100b of cover 5100 may be configured for access as shown schematically in FIGS. 16D and 16E.

According to an exemplary embodiment as shown schematically in FIGS. 15A-15D, 16A-16E, 17A-17D, 18A-18F, 19A-19F, 20A-20F and 21A-21F, a vehicle interior component 5000 shown as a console may comprise a cover 5100, a base 5200 and a mechanism 5300. Cover 5100 may be coupled to base 5200 and may be configured for movement from a closed or latched position to an open position through an unlatched position in response to an external force. According to an exemplary embodiment, base 5200 may comprise a bin/storage compartment SC and cover 5100 may be configured to cover bin/storage compartment SC in the closed or latched position as shown schematically in FIG. 15A and uncover bin/storage compartment SC in the open position as shown schematically in FIG. 15D. Cover 5100 may comprise a door. Mechanism 5300 may be configured to move from a retracted position to an extended position to prevent cover 5100 from moving from the unlatched position toward the open position. Mechanism 5300 may comprise an assembly. Vehicle interior component 5000 may comprise a spring 5400 configured to move door 5100 from the closed or latched position to the open position. Spring 5400 may be configured to move door 5100 from the unlatched position to the open position. Cover 5100 may comprise a stop 5100s. Base 5200 may comprise a stop 5200s.

According to an exemplary embodiment as shown schematically in FIGS. 15A-15D, 16A-16E, 17A-17D, 18A-18F, 19A-19F, 20A-20F and 21A-21F, mechanism 5300 may comprise at least one of (a) a washer 5304; (b) a fastener Fa; (c) a blocker/keeper 5308; (d) a spring shown as a cantilever spring 5310; (e) an arm shown as a pendulum 5312 (e.g. with mass); (f) a spring 5316; (g) a bushing 5318. Blocker/keeper 5308 may comprise at least one of (a) a tab 5308a; (b) a cantilevered portion 5308b; (c) a stop 5308s. Blocker/keeper 5308 may comprise a projection. Spring 5310 may comprise an end portion 5310a. Arm 5312 may comprise a trigger 5312a.

According to an exemplary embodiment as shown schematically in FIGS. 15A-15D, 16A-16E, 17A-17D, 18A-18F, 19A-19F, 20A-20F and 21A-21F, component 5000 may be configured for use in a vehicle subjected in operation to at least one external force such as an applied force. Component 5000 may comprise a base 5200 comprising a bin SC; a cover 5100 configured to move from (a) a latched position as shown schematically in FIGS. 15A, 16A, 16B, 17C, 18A, 18B, 19A and 19B to cover bin SC to (b) an open position as shown schematically in FIGS. 15D and 21E to uncover bin SC through (c) an unlatched position as shown schematically in FIGS. 15B and 16C. Component 5000 may comprise a mechanism 5300 configured to move from a retracted position as shown schematically in FIGS. 15A-15D, 16A-16E, 17C-17D, 18A-18B, 19A-19B and 20E-20F to an extended position as shown schematically in FIGS. 18E-18F, 19E-19F, 20A-20B and 21A-21B to prevent cover 5100 from moving from the unlatched position toward the open position. Mechanism 5300 may be configured to move from the retracted position to the extended position in response to the applied force exceeding a predetermined amount as shown schematically in FIGS. 18A-18F and 19A-19F. Base 5200 may be configured to cover mechanism 5300 when cover 5100 is in the latched position, the unlatched position and the open position. Mechanism 5300 may be configured to hold cover 5100 in a blocked position as shown schematically in FIGS. 18E-18F, 19E-19F, 20A-20B and 21A-21B. Cover 5100 may be configured to (a) move in a closing direction from the latched position to the unlatched position as shown schematically in FIGS. 15A-15B and 16B-16C; (b) move in an opening direction from the unlatched position through the latched position toward the blocked position as shown schematically in FIGS. 15B-15C and 16C-16D. Cover 5100 may comprise a bottom surface 5100b facing away from the interior of the vehicle when cover 5100 is in the latched position; bottom surface 5100b of cover 5100 may be configured for access when cover 5100 is in the blocked position. Cover 5100 may comprise an interface 5100i. Interface 5100i may be configured for access when cover 5100 is in the blocked position as shown schematically in FIG. 18E. Base 5200 may be configured to prevent access to interface 5100i when cover 5100 is in the latched position as shown schematically in FIG. 18A. Cover 5100 may be configured to partially uncover bin SC when cover 5100 is in the blocked position as shown schematically in FIG. 18E. Mechanism 5300 may comprise a blocker 5308 configured to move from a default position to a blocking position as shown schematically in FIGS. 18A-18F and 19A-19F to prevent cover 5100 from moving from the unlatched position to the open position. Blocker 5308 may be configured to move from the blocking position to the default position in response to an applied force on blocker 5308 as shown schematically in FIGS. 20A-20F. Mechanism 5300 may comprise an arm 5312 configured to move from a biased position to a rotated position as shown schematically in FIGS. 18A-18F and 19A-19F to prevent cover 5100 from moving from the unlatched position to the open position. Mechanism 5300 may comprise a spring 5316 configured to bias arm 5312 in the biased position as shown schematically in FIGS. 18A-18B and 19A-19B. Arm 5312 may be configured to move relative to blocker 5308 in response to the applied force exceeding the predetermined amount to allow blocker 5308 to move from the default position to the blocking position as shown schematically in FIGS. 18A-18F and 19A-19F. Mechanism 5300 may comprise a spring 5310 configured to bias blocker 5308 in the blocking position as shown schematically in FIGS. 18E-18F and 19E-19F; spring 5310 may be configured to move blocker 5308 from the default position to the blocking position to prevent cover 5100 from moving from the unlatched position to the open position as shown schematically in FIGS. 18A-18F and 19A-19F. Spring 5310 may comprise a cantilever spring. Mechanism 5300 may be configured to hold cover 5100 in a blocked position in response to the force exceeding the predetermined amount. Cover 5100 may be configured to move from the blocked position to the open position in response to movement of blocker 5308 from the blocking position to the default position. The applied force may comprise an inertial force.

According to an exemplary embodiment as shown schematically in FIGS. 15A-15D, 16A-16E, 17A-17D, 18A-18F, 19A-19F, 20A-20F and 21A-21F, component 5000 may be configured for use in a vehicle subjected in operation to at least one external force such as an applied force. Component 5000 may comprise a base 5200 comprising a compartment SC configured to be accessed through an opening; a door 5100 configured for movement from (a) a closed position as shown schematically in FIGS. 15A, 16A, 16B, 17C, 18A, 18B, 19A and 19B to cover the opening of compartment SC to (b) an open position as shown schematically in FIGS. 15D and 21E to uncover the opening of compartment SC; and a mechanism 5300 configured to be actuated by the applied force and configured to retain door 5100 in a blocked position as shown schematically in FIGS. 18E-18F, 19E-19F, 20A-20B and 21A-21B when the applied force is greater than a predetermined value. The blocked position may comprise a position between the closed position and the open position. Mechanism 5300 may comprise (a) an arm 5312 configured to be actuated by the applied force; (b) a blocker 5308 configured to retain door 5100 in the blocked position; and (c) a spring 5310 configured to engage blocker 5308. Arm 5312 may comprise a mass and may be configured to actuate blocker 5308 to a blocking position when the applied force is greater than the predetermined value. Arm 5312 may be configured to be retained by a spring 5316 in a position to prevent blocker 5308 from retaining door 5100 in the blocked position. Arm 5312 may be configured to move to a position so that blocker 5308 can be deployed to a blocking position when the applied force is greater than the predetermined value. Blocker 5308 may be configured to move under actuation from spring 5310 to block movement of door 5100 when the applied force is greater than the predetermined value.

Figure 17A:
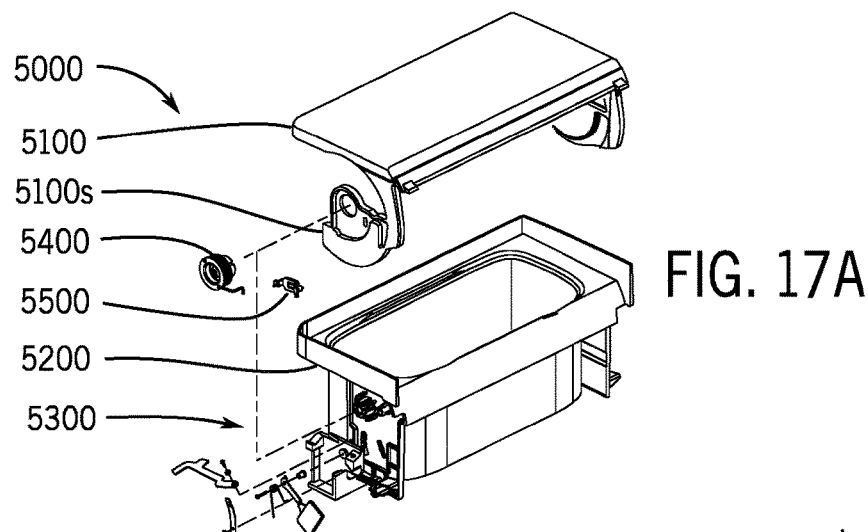
FIG. 17A is a schematic exploded perspective view of a vehicle interior component shown as a console assembly according to an exemplary embodiment.

According to an exemplary embodiment as shown schematically in FIG. 17A, vehicle interior component 5000 (e.g. console, floor console, center console, storage compartment, etc.) may comprise a cover 5100 (e.g. door, shade, blind, etc.), a base 5200, a mechanism 5300, a spring 5400 and a catch 5500.

Figure 17B:
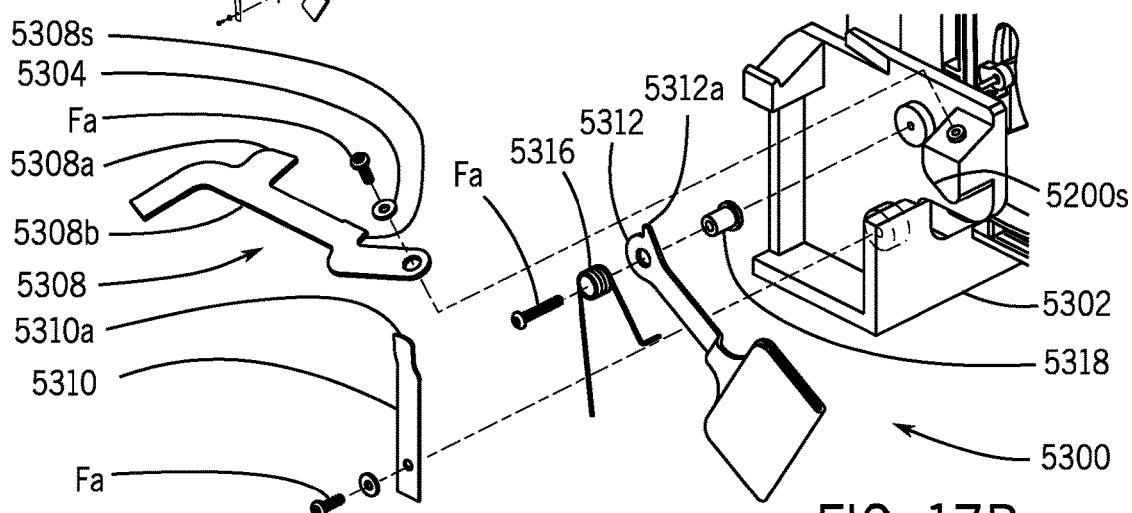
FIG. 17B is a schematic exploded perspective view of a mechanism of a vehicle interior component shown as a console assembly according to an exemplary embodiment.

According to an exemplary embodiment as shown schematically in FIG. 17B, mechanism 5300 may be coupled to base 5200 at a mounting structure/plate shown as base plate 5302. Mechanism 5300 comprise a washer 5304, a blocker or keeper 5308, a spring shown as flat or cantilever spring 5310, a member shown as arm 5312, a spring shown as torsion spring 5316, a bushing 5318 and one or more fasteners F. Blocker/keeper 5308 may comprise a tab 5308a and a portion 5308b. Spring 5310 may comprise a portion 5310a. Arm 5312 may comprise a release or trigger 5312a.

Figure 17C:
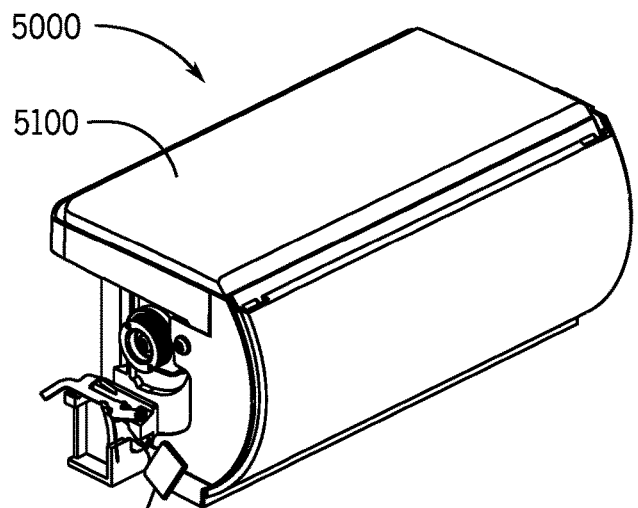
FIG. 17C is a schematic perspective view of a vehicle interior component shown as a console assembly according to an exemplary embodiment.
Figure 17D:
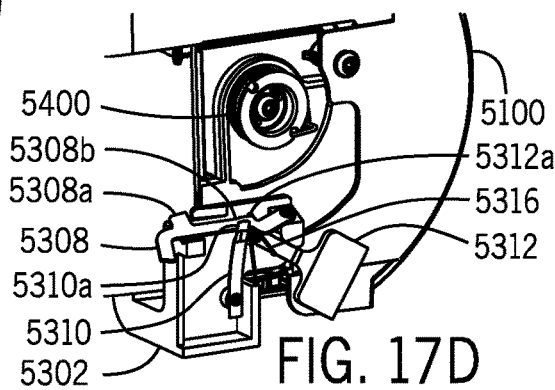
FIG. 17D is a schematic partial perspective view of a mechanism of a vehicle interior component shown as a console assembly according to an exemplary embodiment.
Figure 18A:
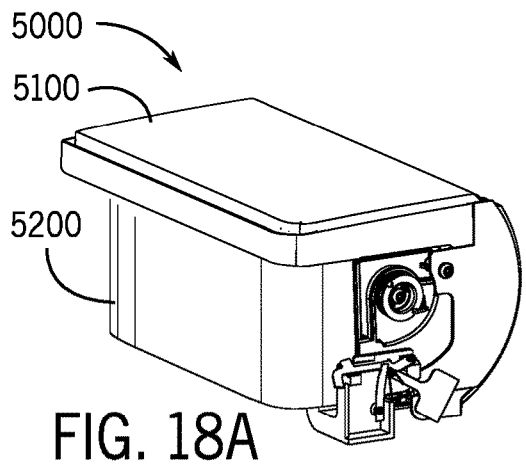
FIG. 18A is a schematic perspective view of a vehicle interior component shown as a console assembly according to an exemplary embodiment.
Figure 18B:
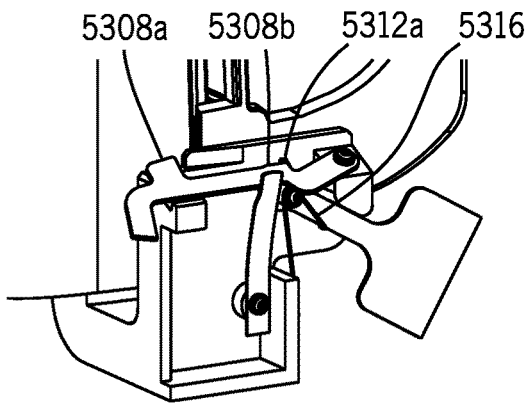
FIG. 18B is a schematic partial perspective view of a vehicle interior component shown as a console assembly according to an exemplary embodiment.
Figure 18C:
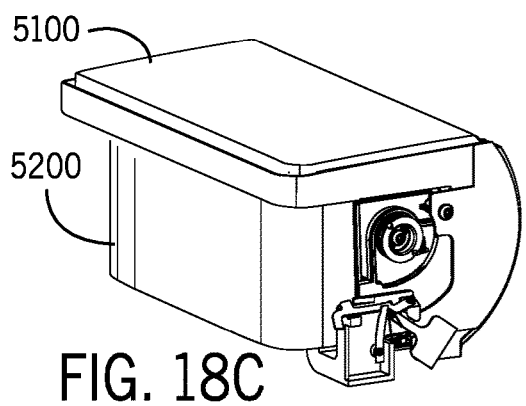
FIG. 18C is a schematic perspective view of a vehicle interior component shown as a console assembly according to an exemplary embodiment.
Figure 18D:
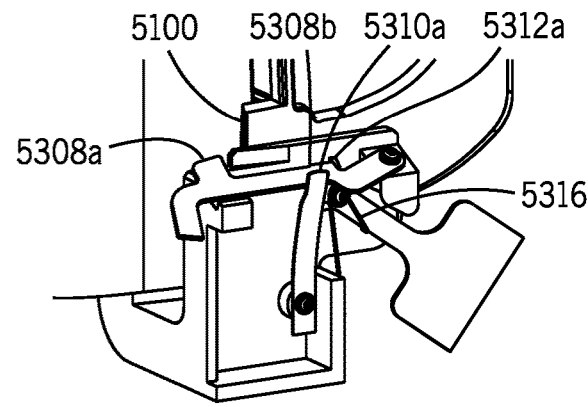
FIG. 18D is a schematic partial perspective view of a vehicle interior component shown as a console assembly according to an exemplary embodiment.
Figure 18E:
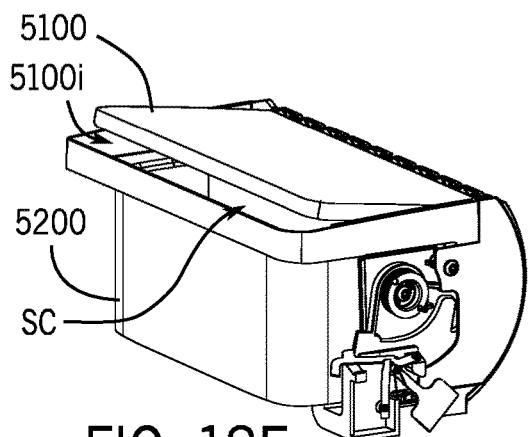
FIG. 18E is a schematic perspective view of a vehicle interior component shown as a console assembly according to an exemplary embodiment.
Figure 18F:
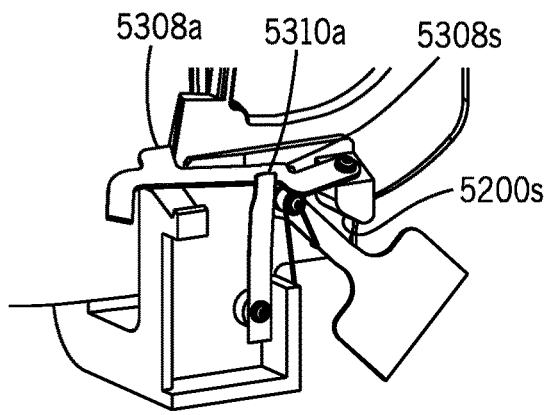
FIG. 18F is a schematic partial perspective view of a vehicle interior component shown as a console assembly according to an exemplary embodiment.
Figure 19A:
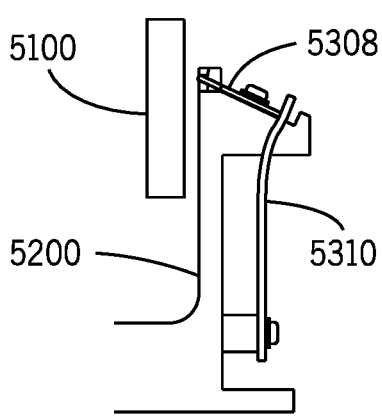
FIG. 19A is a schematic partial section view of a vehicle interior component shown as a console assembly according to an exemplary embodiment.
Figure 19B:
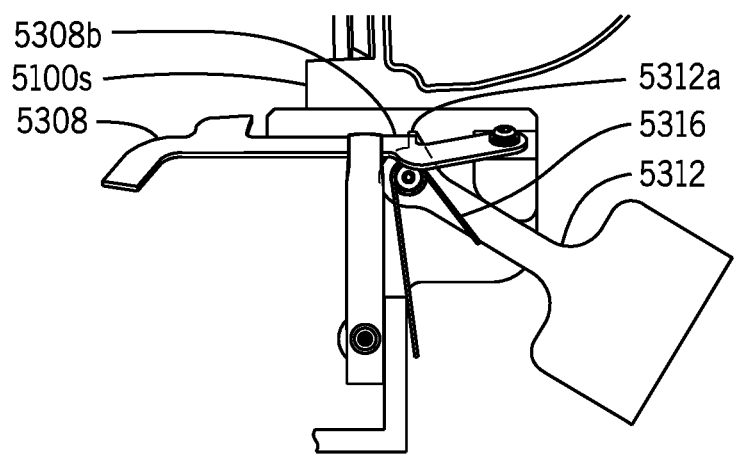
FIG. 19B is a schematic partial perspective view of a vehicle interior component shown as a console assembly according to an exemplary embodiment.
Figure 19C:
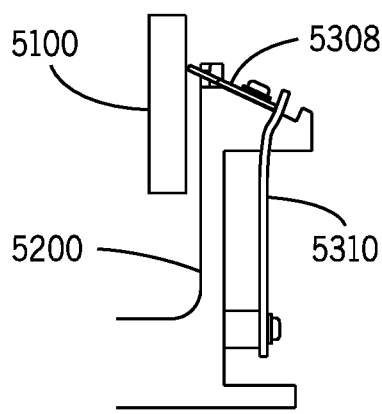
FIG. 19C is a schematic partial section view of a vehicle interior component shown as a console assembly according to an exemplary embodiment.
Figure 19D:
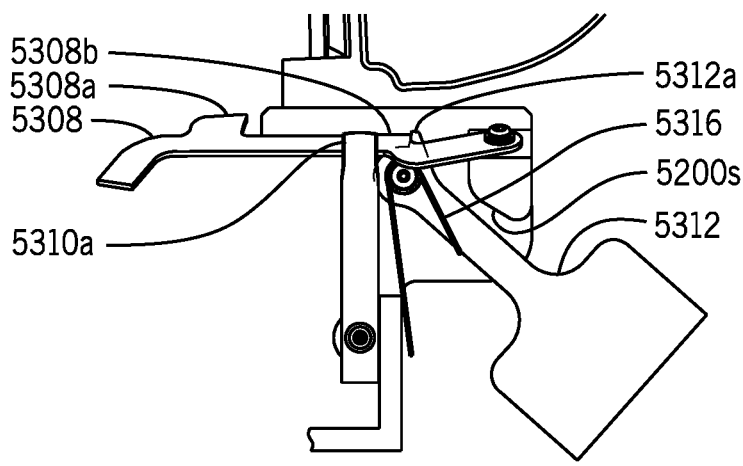
FIG. 19D is a schematic partial perspective view of a vehicle interior component shown as a console assembly according to an exemplary embodiment.
Figure 19E:
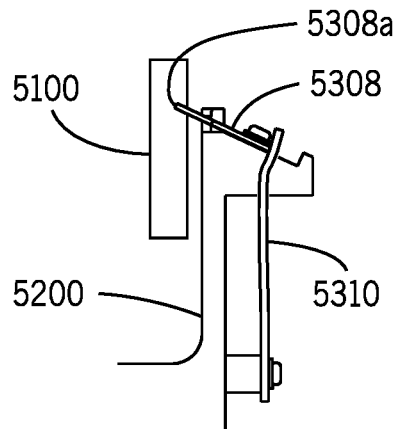
FIG. 19E is a schematic partial section view of a vehicle interior component shown as a console assembly according to an exemplary embodiment.
Figure 19F:
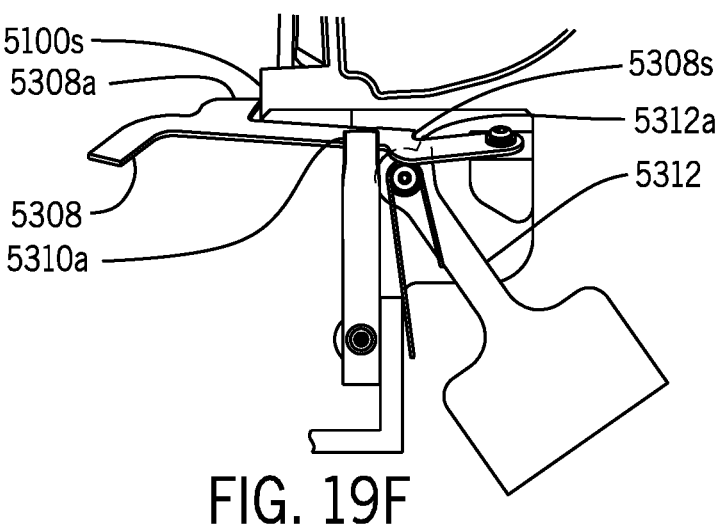
FIG. 19F is a schematic partial perspective view of a vehicle interior component shown as a console assembly according to an exemplary embodiment.

According to an exemplary embodiment as shown schematically in FIGS. 17C and 17D, arm 5312 may be in a biased position.

According to an exemplary embodiment as shown schematically in FIGS. 18A, 18B, 7A and 7B, cover 5100 may be in a closed or latched position relative to base 5200. Blocker 5308 may be held in a default position by engagement of trigger 5312a of arm 5312 with a portion 5308b of blocker 5308. Arm 5312 may be biased in a biased position by spring 5316.

According to an exemplary embodiment as shown schematically in FIGS. 18C, 18D, 7C and 7D, cover 5100 may be in an unlatched position relative to base 5200 in response to an inertial force. The inertial force may overcome the force provided by spring 5316 to move arm 5312 from the biased position toward a rotated position. Trigger 5312a may disengage from portion 5308b of blocker 5308 and a portion 5310a of spring 5310 may move tab 5308a toward cover 5100.

According to an exemplary embodiment as shown schematically in FIGS. 18E, 18F, 19E and 19F, cover 5100 may be in a blocked position relative to base 5200, arm 5312 may be in the rotated position. Portion 5310a of spring 5310 may bias blocker 5308 in a blocking position; tab 5308a of blocker 5308 may prevent movement of cover 5100 from the unlatched position toward an open position. Mechanism 5300 may be configured to hold cover 5100 in the blocked position in response to a force exceeding the predetermined amount.

Figures 20A, 20B:
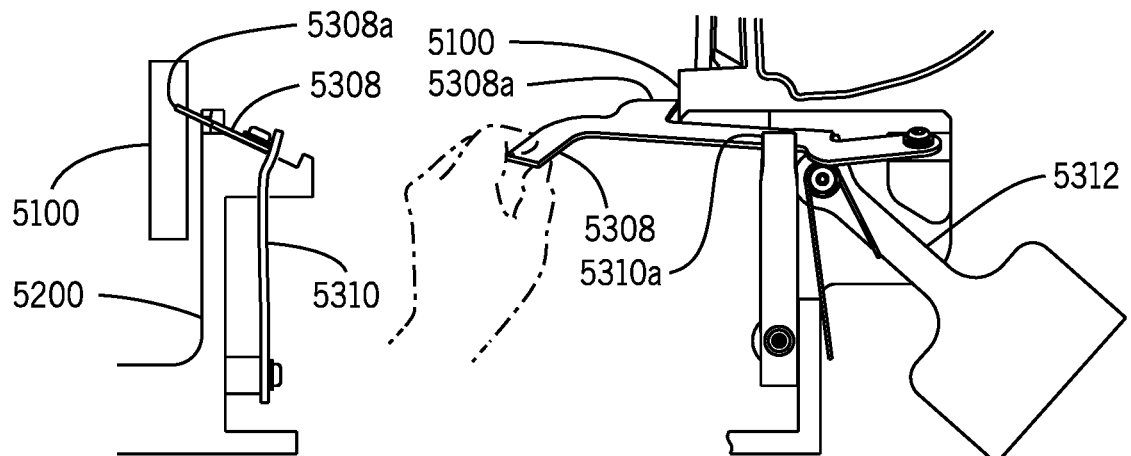
FIG. 20A is a schematic partial section view of a vehicle interior component shown as a console assembly according to an exemplary embodiment.
FIG. 20B is a schematic partial perspective view of a vehicle interior component shown as a console assembly according to an exemplary embodiment.

According to an exemplary embodiment as shown schematically in FIGS. 20A and 20B, cover 5100 may be in a blocked position relative to base 5200, arm 5312 may be in the rotated position. Portion 5310a of spring 5310 may bias blocker 5308 in a blocking position; tab 5308a of blocker 5308 may prevent movement of cover 5100 from the unlatched position toward the open position. A hand may provide a force acting on blocker 5308 to move blocker 5308 from the blocking position toward the default position.

Figures 20C, 20D:
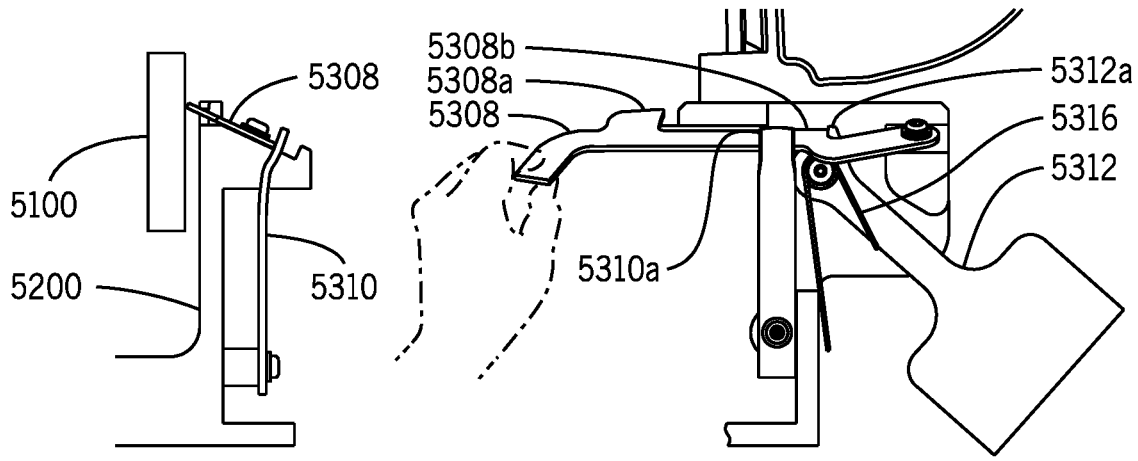
FIG. 20C is a schematic partial section view of a vehicle interior component shown as a console assembly according to an exemplary embodiment.
FIG. 20D is a schematic partial perspective view of a vehicle interior component shown as a console assembly according to an exemplary embodiment.

According to an exemplary embodiment as shown schematically in FIGS. 20C and 20D, a hand may provide a force acting on blocker 5308 to (a) overcome the force applied by spring 5310, (b) deflect spring 5310 and (c) move blocker 5308 out of engagement with cover 5100.

Figures 20E, 20F:
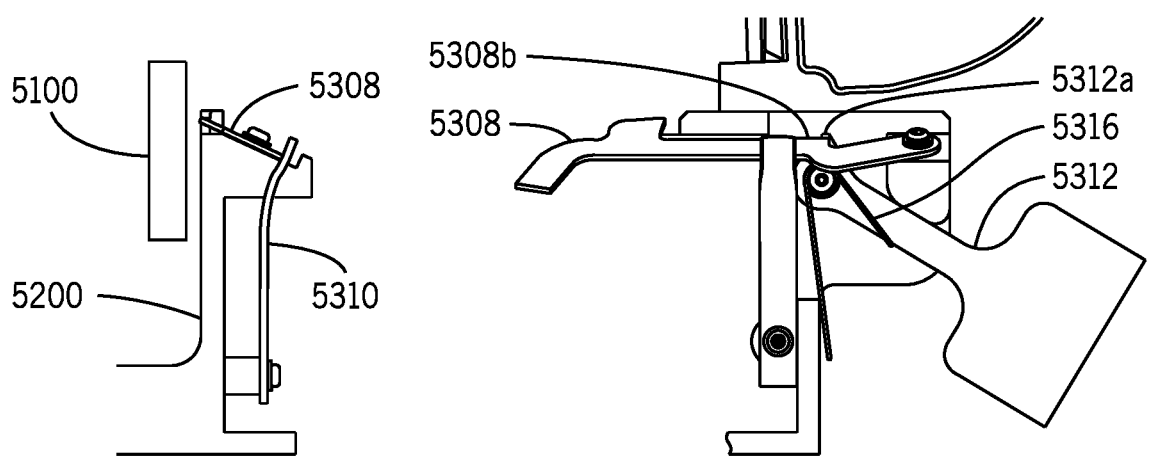
FIG. 20E is a schematic partial section view of a vehicle interior component shown as a console assembly according to an exemplary embodiment.
FIG. 20F is a schematic partial perspective view of a vehicle interior component shown as a console assembly according to an exemplary embodiment.
Figure 21A:
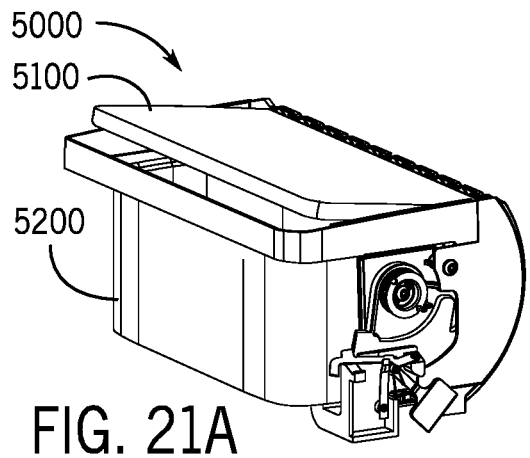
FIGS. 21A through 21F are schematic partial perspective views of a vehicle interior component shown as a console assembly according to an exemplary embodiment.
Figure 21B:
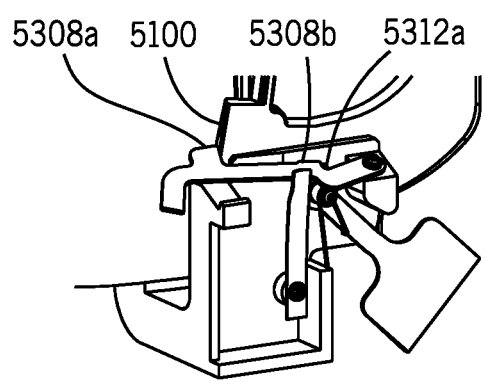
Figure 21C:
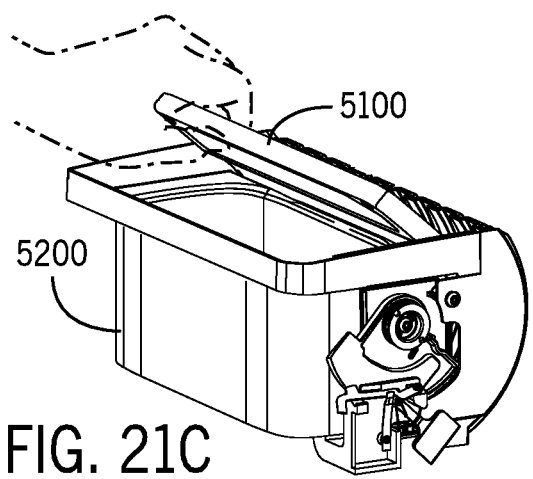
Figure 21D:
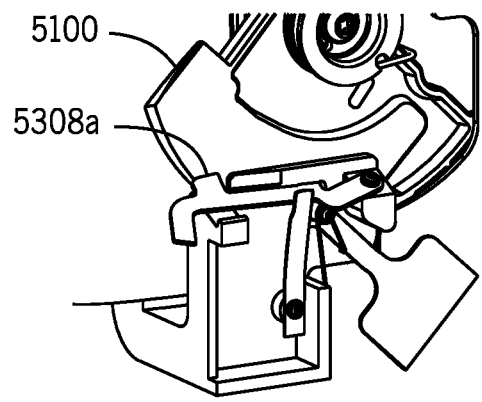
Figure 21E:
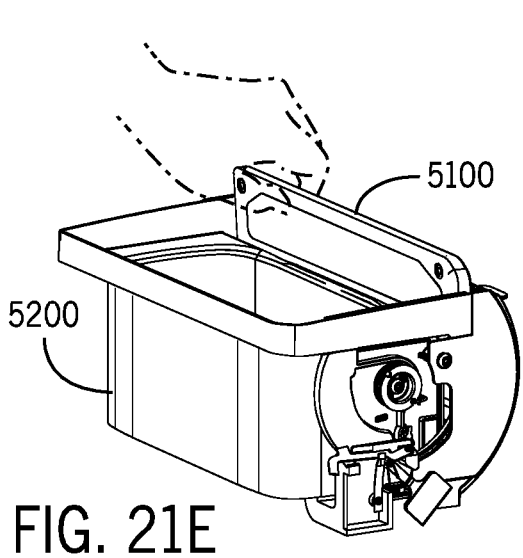
Figure 21F:
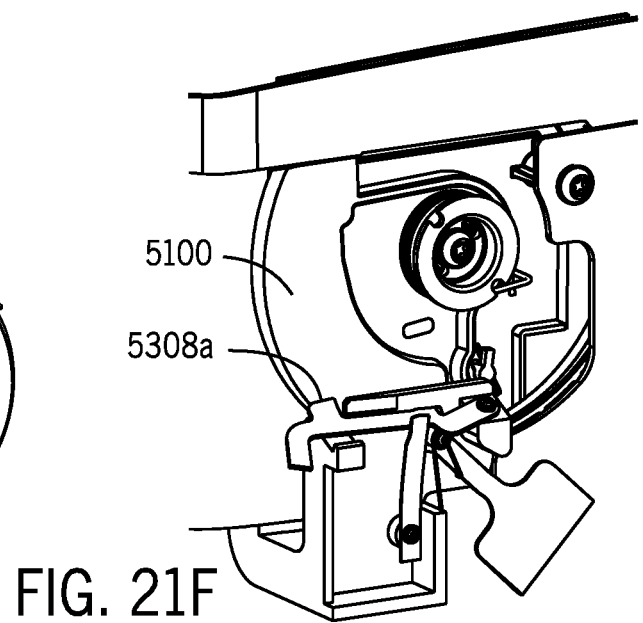
Figure 22A:
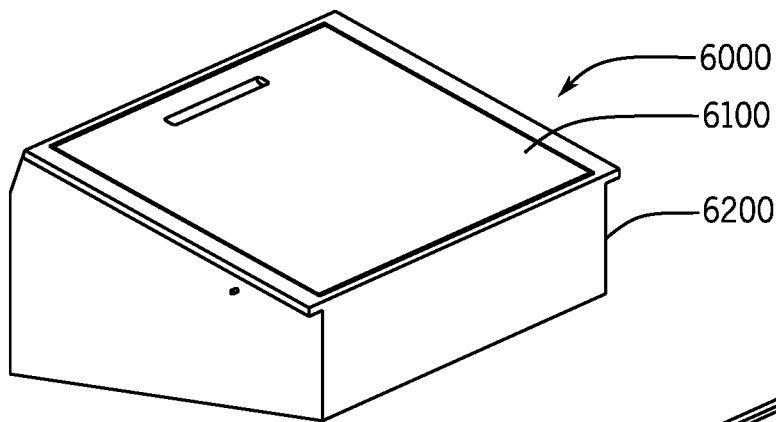
FIGS. 22A through 22D are schematic perspective views of a conventional vehicle interior component shown as a console assembly according to an exemplary embodiment.
Figure 22B:
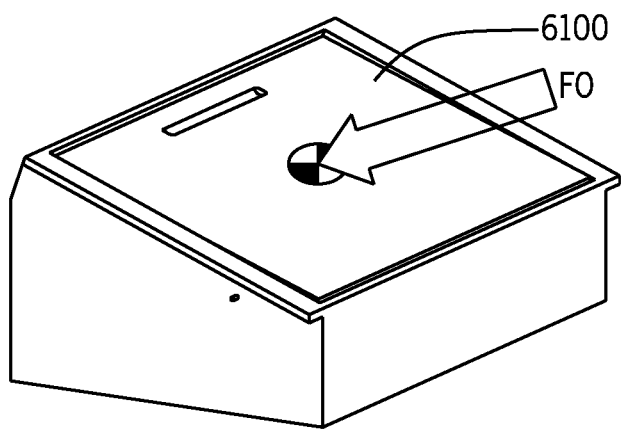
Figure 22C:
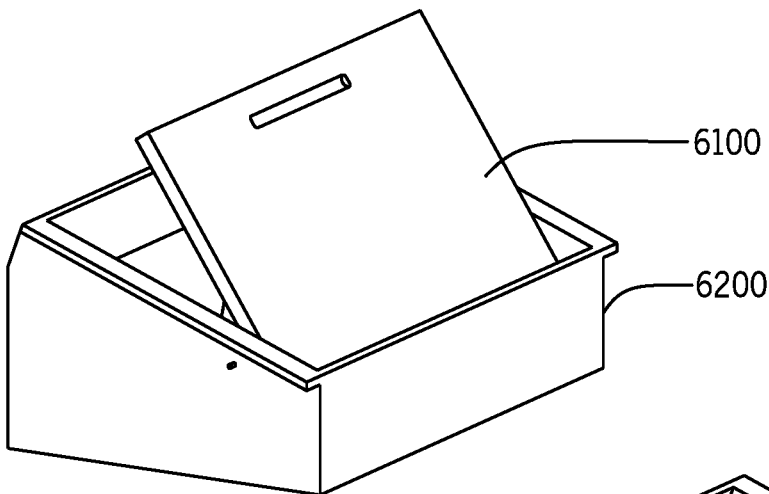
Figure 22D:
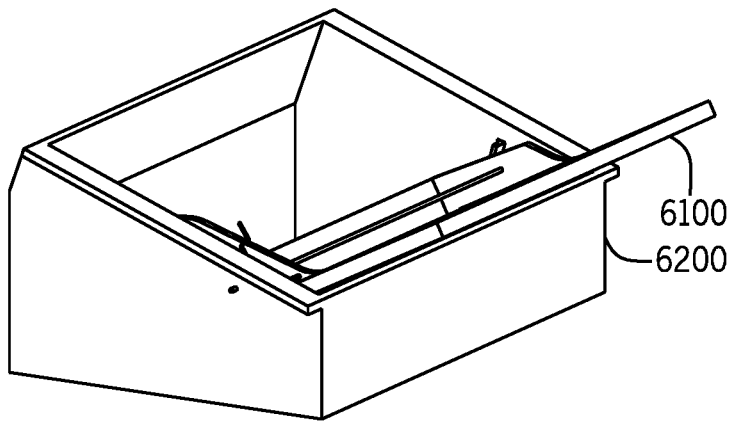

According to an exemplary embodiment as shown schematically in FIGS. 20E and 20F, blocker 5308 may be moved from the blocking position to the default position. Trigger 5312a of arm 5312 may engage with portion 5308b of blocker 5308. Cover 5100 may move from the blocked position toward the open position by spring 5400. Cover 5100 may be configured to move from the blocked position to the open position in response to movement of blocker 5308 from the blocking position to the default position.

According to an exemplary embodiment as shown schematically in FIGS. 21A-21F, cover 5100 may be configured to move from the blocked position to the open position in response to an external force on door 5100.

According to an exemplary embodiment as shown schematically in FIGS. 22A through 22D, a conventional vehicle interior component 6000 shown as a console may comprise a cover 6100 and a base 6200. Cover 6100 may be coupled to base 6200 and may be configured for movement between a closed position and an open position in response to an external force. According to an exemplary embodiment, base 6200 may comprise a storage compartment and cover 6100 may be configured to cover the storage compartment in the closed position and uncover the storage compartment in the open position. By application of an external force FO acting against the center of gravity of cover 6100, cover 6100 may be rotated (e.g. downward) toward an unlatched position and a conventional spring may provide a force to move cover 6100 from the unlatched position toward an open position.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured for use in a vehicle by an occupant and subjected in operation to at least one external force such as an applied force comprising:
   a base comprising a bin;
   a cover configured for movement relative to the base between a closed position to cover the bin and an open position to allow access to the bin; and
   a mechanism configured to provide a retracted position and an extended position;
   wherein the cover is configured to provide (a) a latched state to retain the cover at the closed position and (b) an unlatched state to allow movement of the cover of between the closed position and the open position and (c) a blocked state to prevent movement of the cover toward the open position;

wherein the mechanism is configured to move from the retracted position to the extended position to hold the cover in the blocked state;

wherein the cover is configured to provide an interface for application of an applied force by the occupant underneath the cover when the cover is in the blocked state so that the cover can be pulled by the occupant toward the open position;

wherein the cover is configured to move the mechanism from the extended position to the retracted position in response to the applied force by the occupant at the interface when the cover is pulled directly away from the base by the occupant from the blocked state toward the open position;

wherein the cover is configured to be moved between the open position and the closed position when the mechanism is in the retracted position.

2. The component of claim 1 wherein the mechanism is configured to move from the retracted position to the extended position to block opening of the cover in response to an inertia force on the cover.

3. The component of claim 2 wherein the interface for the applied force by the occupant comprises a surface of the cover facing away from the interior of the vehicle.

4. The component of claim 1 wherein the mechanism comprises a blocker configured to move from a default position to a blocking position to prevent the cover from moving to the open position.

5. The component of claim 4 wherein the blocker is configured to slide against the cover to move from the blocking position to the default position.

6. The component of claim 4 wherein the base comprises a tab configured to move to allow the blocker to move into engagement with the cover to hold the cover in the blocked state.

7. The component of claim 1 wherein the mechanism comprises an arm configured to engage a tab; wherein the arm is configured to move from a biased position with the arm engaged with the tab to hold the mechanism in the retracted position to a rotated position with the arm engaged with the tab to hold the mechanism in the extended position to prevent the cover from moving to the open position.

8. A component for a vehicle interior configured for use in a vehicle subjected in operation to at least one external force such as an applied force comprising:

a base comprising a bin;

a cover configured to move from (a) a closed position to cover the bin to (b) an open position to uncover the bin; and a mechanism comprising a tab and configured to hold the cover in a blocked state to prevent the cover from moving to the open position;

wherein the tab is configured (a) to hold the mechanism in a retracted position and (b) to hold the mechanism in an extended position;

wherein the mechanism is configured to move from the retracted position with the cover unblocked from movement to the open position to the extended position with the cover blocked from movement to the open position to hold the cover in the blocked state;

wherein the mechanism comprises an arm configured to engage the tab to hold the mechanism in the retracted position;

wherein the arm is configured to bend the tab to allow the mechanism to move from the retracted position toward the extended position;

wherein the arm is configured to hold the cover in the blocked state.

9. The component of claim 8 wherein the base comprises the tab; wherein the arm is configured to engage the tab directly to hold the mechanism in the retracted position.

10. The component of claim 8 wherein the arm is configured to deflect the tab to move the mechanism from the extended position toward the retracted position.

11. The component of claim 8 further comprising a bracket coupled to the base; wherein the bracket comprises the tab.

12. A component for an interior of a vehicle configured to be subjected to an applied force by an occupant and an external force by an event comprising:

a base comprising a tab;

a cover configured for movement relative to the base to an open position; and a member coupled to the base;

wherein the member is configured to provide a disengaged position to allow movement of the cover toward the open position;

wherein the member is configured to hold the cover in a blocked state to prevent movement of the cover toward the open position;

wherein the member is configured to bend the tab during movement of the member from the disengaged position to an engaged position to hold the cover in the blocked state.

13. The component of claim 12 wherein the member is configured to bend the tab in response to the external force.

14. The component of claim 12 wherein the member is configured to bend the tab during movement from an engaged position holding the cover in the blocked state to the disengaged position.

15. The component of claim 12 wherein the member is configured to provide an engaged position blocked by the tab of the base and with the cover blocked by the member to hold the cover in the blocked state.

16. The component of claim 15 wherein the member is configured to bend the tab to unblock the member to be moved from the engaged position to the disengaged position to allow movement of the cover.

17. The component of claim 15 wherein the member is configured to provide the engaged position blocked at the tab of the base and with the cover blocked by a projection of the member to hold the cover in the blocked state.

18. The component of claim 12 wherein the member comprises a unitary member comprising an arm configured to engage the tab of the base and a projection configured to engage the cover.

19. The component of claim 18 wherein the arm of the member is configured to deflect the tab to unblock the arm at the tab when the member is rotated from the engaged position to the disengaged position by the applied force; wherein the member is configured to extend the arm to engage the tab for the blocked state when the member is rotated from the disengaged position to the engaged position by the external force.

20. The component of claim 18 further comprising a mechanism comprising the member; wherein the projection of the member comprises a blocker configured to engage a surface at the cover for the blocked state; wherein the member is configured to rotate independently relative to the base and/or independently relative to the cover; wherein the disengaged position comprises a retracted position and the engaged position comprises an extended position.

\* \* \* \* \*